(12) United States Patent
Moore et al.

(10) Patent No.: US 12,478,353 B2
(45) Date of Patent: Nov. 25, 2025

(54) MULTIPLE SENSOR CATHETER ASSEMBLY

(71) Applicant: ZED MEDICAL, INC., Livermore, CA (US)

(72) Inventors: Thomas C. Moore, Livermore, CA (US); Donald Masters, Sylmar, CA (US); Robert H. Fenton, El Dorado Hills, CA (US)

(73) Assignee: Zed Medical, Inc., Livermore, CA (US)

( * ) Notice: Subject to any disclaimer, the term of this patent is extended or adjusted under 35 U.S.C. 154(b) by 0 days.

(21) Appl. No.: 16/991,745

(22) Filed: Aug. 12, 2020

(65) Prior Publication Data
US 2021/0045718 A1 Feb. 18, 2021

Related U.S. Application Data

(60) Provisional application No. 62/886,284, filed on Aug. 13, 2019.

(51) Int. Cl.
*A61B 8/12* (2006.01)
*A61B 8/00* (2006.01)

(52) U.S. Cl.
CPC ............... *A61B 8/54* (2013.01); *A61B 8/12* (2013.01); *A61B 8/4488* (2013.01); *A61B 8/4494* (2013.01); *A61B 8/483* (2013.01)

(58) Field of Classification Search
CPC ....... A61B 8/12; A61B 8/4488; A61B 8/4494; A61B 8/483; A61B 8/54; G01S 15/8915;
(Continued)

(56) References Cited

U.S. PATENT DOCUMENTS 4,917,097 A  4/1990  Proudian et al.
6,129,672 A  10/2000  Seward et al.
(Continued)

FOREIGN PATENT DOCUMENTS

JP  2002526143 A  8/2002
JP  2012502692 A  2/2012
(Continued)

OTHER PUBLICATIONS

Bill McDaniel, "An Algorithm for Error Correcting Cyclic Redundance Checks," Jun. 1, 2003, Dr. Dobb's: The World of Software Development (Year: 2003).*

(Continued)

*Primary Examiner* — Michael J Carey
*Assistant Examiner* — Maria Christina Talty
(74) *Attorney, Agent, or Firm* — Merchant & Gould P.C.

(57) ABSTRACT

An ultrasound imaging device includes a substrate, an ultrasound transducer array mounted on the substrate, a pressure sensor mounted on the substrate, and an integrated circuit mounted on the substrate and operatively connected to the ultrasound transducer array and to the pressure sensor. The integrated circuit includes a memory that is programmable to store a transmit-receive sequence and operational codes to optimize a sub-aperture of the ultrasound transducer array to support an ultrasound scanning modality that is selected for the ultrasound imaging device.

14 Claims, 12 Drawing Sheets

(58) Field of Classification Search
CPC ............... G01S 15/8927; G01S 7/5208; G01S 7/52085; G01S 7/52096
See application file for complete search history.

(56) References Cited

U.S. PATENT DOCUMENTS

| | | | |
|---|---|---|---|
| 6,283,921 B1* | 9/2001 | Nix | A61B 8/4488 600/467 |
| 6,383,139 B1 | 5/2002 | Hwang et al. | |
| 6,471,656 B1 | 10/2002 | Shalman et al. | |
| 8,157,739 B2* | 4/2012 | Angelsen | A61B 8/12 600/447 |
| 10,555,720 B2* | 2/2020 | Corl | B06B 1/0633 |
| 2001/0051766 A1* | 12/2001 | Gazdzinski | A61B 10/02 606/1 |
| 2004/0092830 A1 | 5/2004 | Scott et al. | |
| 2005/0121734 A1 | 6/2005 | Degertekin et al. | |
| 2009/0112091 A1* | 4/2009 | Chiang | G01S 15/8934 600/447 |
| 2009/0163818 A1 | 6/2009 | Zelenka et al. | |
| 2010/0130855 A1* | 5/2010 | Lundberg | G01S 15/8995 382/128 |
| 2010/0286522 A1 | 11/2010 | Beach et al. | |
| 2013/0178744 A1* | 7/2013 | Kierulf | A61B 8/461 600/459 |
| 2013/0237864 A1 | 9/2013 | Mazar et al. | |
| 2013/0303914 A1 | 11/2013 | Hiltner et al. | |
| 2014/0180122 A1 | 6/2014 | Stigall et al. | |
| 2014/0180127 A1 | 6/2014 | Seward et al. | |
| 2014/0180143 A1* | 6/2014 | Millett | A61B 5/0215 600/488 |
| 2014/0276011 A1 | 9/2014 | Schmitt et al. | |
| 2015/0112188 A1 | 4/2015 | Stigall et al. | |
| 2015/0223707 A1 | 8/2015 | Ludoph | |
| 2015/0305708 A1 | 10/2015 | Stigall et al. | |
| 2015/0305710 A1* | 10/2015 | Stigall | G10K 11/002 600/424 |
| 2015/0313479 A1* | 11/2015 | Stigall | A61B 8/0891 600/467 |
| 2016/0081657 A1 | 3/2016 | Rice | |
| 2016/0166232 A1 | 6/2016 | Merritt | |
| 2017/0032523 A1 | 2/2017 | Klaiman et al. | |
| 2017/0055941 A1 | 3/2017 | Stigall et al. | |
| 2017/0257175 A1* | 9/2017 | Ouzounov | B06B 1/0207 |
| 2018/0235571 A1 | 8/2018 | Moore et al. | |
| 2018/0235572 A1 | 8/2018 | Moore et al. | |
| 2018/0284250 A1* | 10/2018 | Bjaerum | G01S 7/52085 |
| 2019/0029645 A1* | 1/2019 | Cao | A61B 8/5207 |
| 2019/0216426 A1* | 7/2019 | Saroha | B06B 1/0633 |
| 2019/0285746 A1* | 9/2019 | Tan | G10K 11/346 |
| 2019/0307420 A1* | 10/2019 | Minas | A61B 8/445 |
| 2019/0388055 A1* | 12/2019 | Minas | A61B 8/12 |
| 2020/0367854 A1* | 11/2020 | Jacobs | A61B 8/4494 |

FOREIGN PATENT DOCUMENTS

| | | |
|---|---|---|
| JP | 2017513643 A | 6/2017 |
| JP | 2017518151 A | 7/2017 |
| WO | 2010031057 A1 | 3/2010 |
| WO | 2015/073817 A1 | 5/2015 |

OTHER PUBLICATIONS

Jonathan R. Engdahl and Dukki Chung, "Fast Parallel CRC Implementation in Software," 2014, 14th International Conference on Control, Automation and Systems (ICCAS 2014), pp. 546-550 (Year: 2014).*

Graham C. Aucott et al., "Simple technique for beam steering of CW phased-array transducers," 2002, IEEE Ultrasonics Symposium, 2, pp. 1681-1685 (Year: 2002).*

"Application Specific Integrated Circuit," Aug. 2, 2014, Mepits (Year: 2014).*

International Search Report and Written Opinion of the International Searching Authority, PCT/US2020/045981, mailed Feb. 11, 2021, 28 pages.

Japanese Office Action in Application 2022-509133, mailed Feb. 13, 2024, 4 pgs.

* cited by examiner

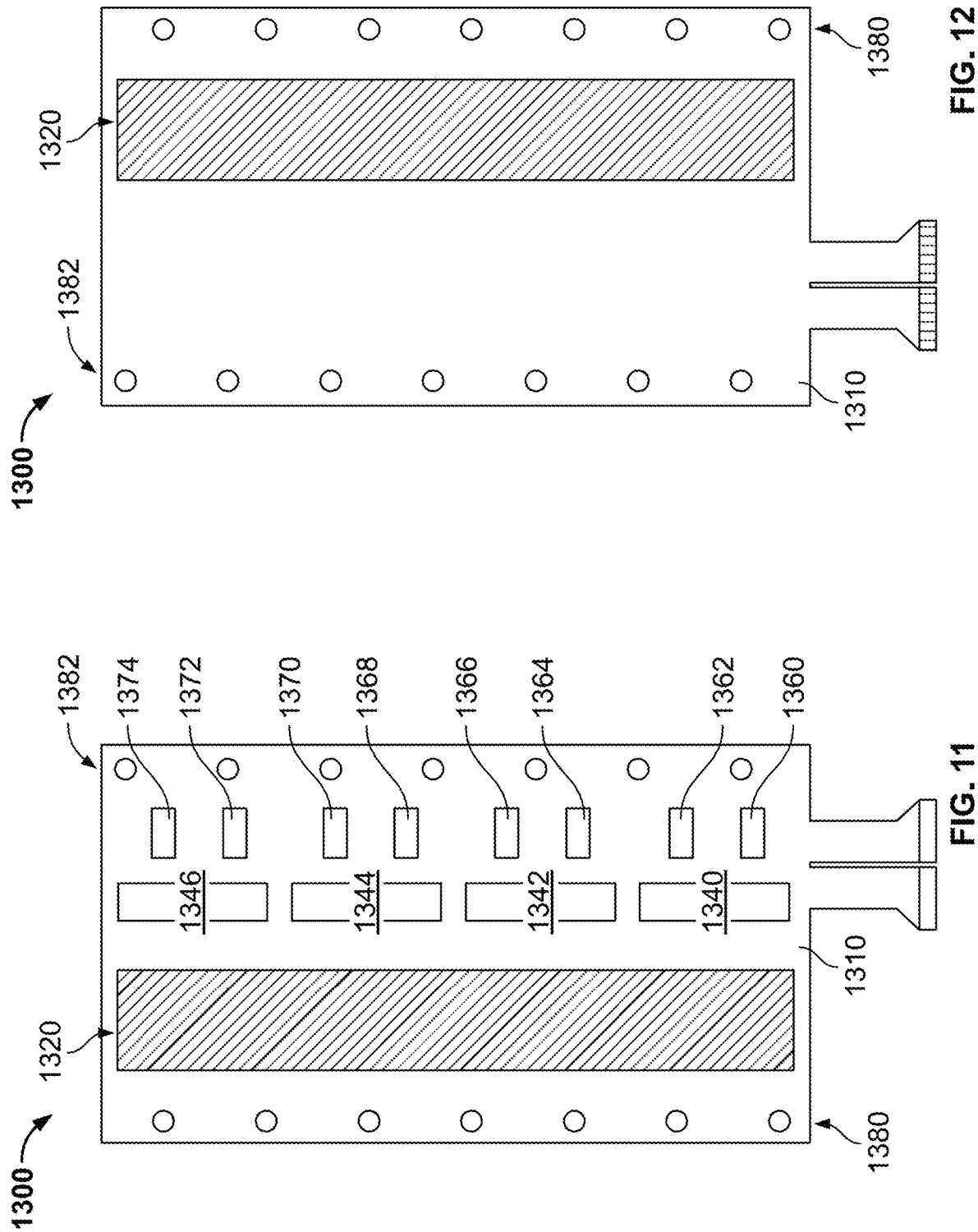

MULTIPLE SENSOR CATHETER ASSEMBLY

CROSS-REFERENCE TO RELATED APPLICATION(S)

This application claims the benefit of U.S. Provisional Application No. 62/886,284, titled MULTIPLE SENSOR CATHETER ASSEMBLY, filed on Aug. 13, 2019, the disclosure of which is hereby incorporated by reference in its entirety.

BACKGROUND

Catheters and endoscopes are diagnostic devices that are used to guide medical interventions such as percutaneous coronary interventions and pulmonary lymph node biopsies. Typical design constraints for catheters and endoscopes include device size for anatomical access, and thermal performance for patient safety. Further, there are competing clinical user needs that generally add complexity to these devices such as preference for multiple sensors. For example, use of multiple sensors can improve workflow and performance by reducing the quantity of device exchanges.

It would be advantageous for diagnostic catheter and endoscope devices to integrate more complex sensors, including ultrasound imaging arrays and physiological sensors. It would be further advantageous for these devices to reduce heat generation for patient safety and reduce the number of wires for size constraints. It would be still further advantageous for a flexible solution to enable use for multiple clinical applications.

SUMMARY

The present disclosure relates generally to medical devices used for imaging and sensing within a lumen or cavity. In one possible configuration, catheters and endoscopes are described for ultrasound imaging and physiological sensing. Various aspects are described in this disclosure, which include, but are not limited to, the following aspects.

In one aspect, an ultrasound imaging device comprises an ultrasound transducer array having a plurality of transducer array elements; and an integrated circuit operatively connected to the ultrasound transducer array, the integrated circuit including a memory programmable to store a transmit-receive sequence and operational codes to optimize a sub-aperture of the ultrasound transducer array to support an ultrasound scanning modality that is selected for the ultrasound imaging device, the sub-aperture having a subset of transducer array elements less than the plurality of transducer array elements.

Another aspect relates to an imaging assembly for an ultrasound imaging device. The imaging assembly comprises an ultrasound transducer array; and a controller operatively connected to the ultrasound transducer array, the controller having a memory that is programmable to store instructions which, when executed by the controller, cause the controller to: operate in an initialization mode that includes receiving a transmit-receive sequence and operational codes and storing them in the memory, the operational codes configuring the imaging assembly to perform an ultrasound scanning modality selected from a group consisting of a cylindrical ultrasound scanning modality, a side ultrasound scanning modality, and a forward looking 3D ultrasound scanning modality; and operate in a mission mode that includes executing the transmit-receive sequence to optimize performance of the selected ultrasound scanning modality by the ultrasound transducer array Another aspect relates to a method of performing ultrasound imaging using a programmable imaging assembly. The method comprising: selecting an ultrasound scanning modality; assembling the imaging assembly for the selected ultrasound scanning modality; uploading a transmit-receive sequence and opcodes to a memory of the imaging assembly, the transmit-receive sequence and opcodes configuring the imaging assembly to perform the selected ultrasound scanning modality; acquiring ultrasound signal data from the imaging assembly; and processing the acquire ultrasound signal data for displaying ultrasound images in accordance with the selected ultrasound scanning modality on a display device.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

FIG. 11 is a top view of an example imaging assembly of the endobronchial ultrasound bronchoscope of FIG. 10, the imaging assembly is shown before forming.

FIG. 12 is a bottom view of the imaging assembly of FIG. 11.

DETAILED DESCRIPTION

Figure 1:
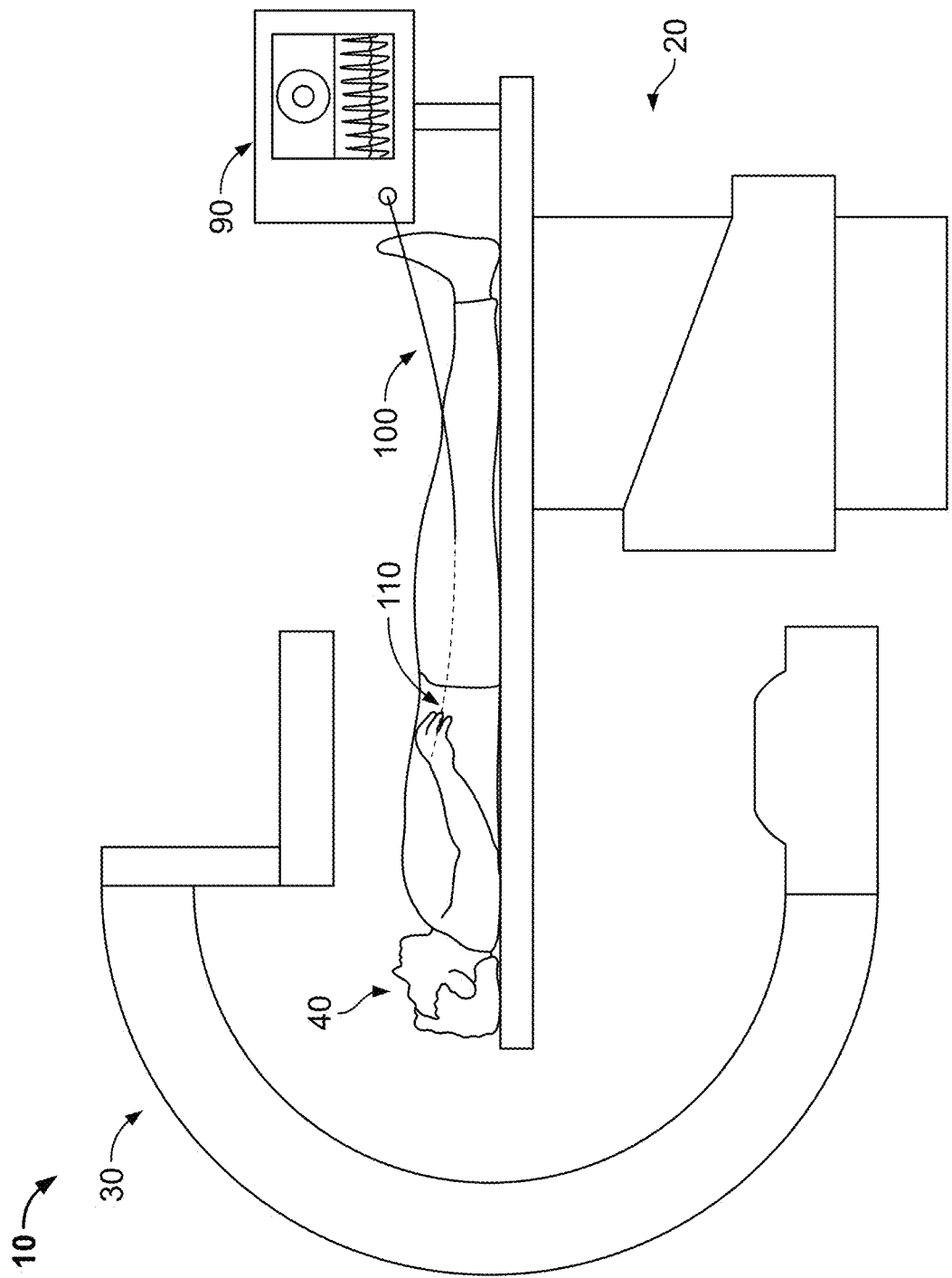
FIG. 1 illustrates an example catheter laboratory.

Various embodiments will be described in detail with reference to the drawings, wherein like reference numerals represent like parts and assemblies throughout the several views. Reference to various embodiments does not limit the scope of the attached claims. Additionally, any examples set forth in this specification are not intended to be limiting and merely set forth some of the many possible embodiments for the claims.

The embodiments described herein relate to catheters, needles, cannulas, endoscopes, and the like with multiple sensors to guide the treatment of patients. In some applications, a catheter is designed for use in a coronary artery. In further applications, an endoscope is designed for use in bronchi or airways in the lungs. Additionally, the embodiments described herein are not limited to the above-referenced applications.

FIG. 1 is an illustrative example of a catheter laboratory 10 that includes a patient table 20 and an X-ray C-arm 30 for guiding diagnostic and therapeutic cardiovascular interventions of a patient 40. The catheter laboratory 10 may also include an intravascular ultrasound (IVUS) imaging and pressure sensing console 90 and catheter 100.

The IVUS imaging and pressure sensing console 90 may house various operating components that control the operation of the catheter 100, send signals to or receive signals from catheter 100, or store data generated by or used with the catheter 100. In some examples, the IVUS imaging and pressure sensing console 90 also includes a user interface that enables a physician to interact with the catheter 100 and/or display information generated by the catheter. The broken lines in FIG. 1 represent portions of catheter 100 within the patient 40.

Figure 2:
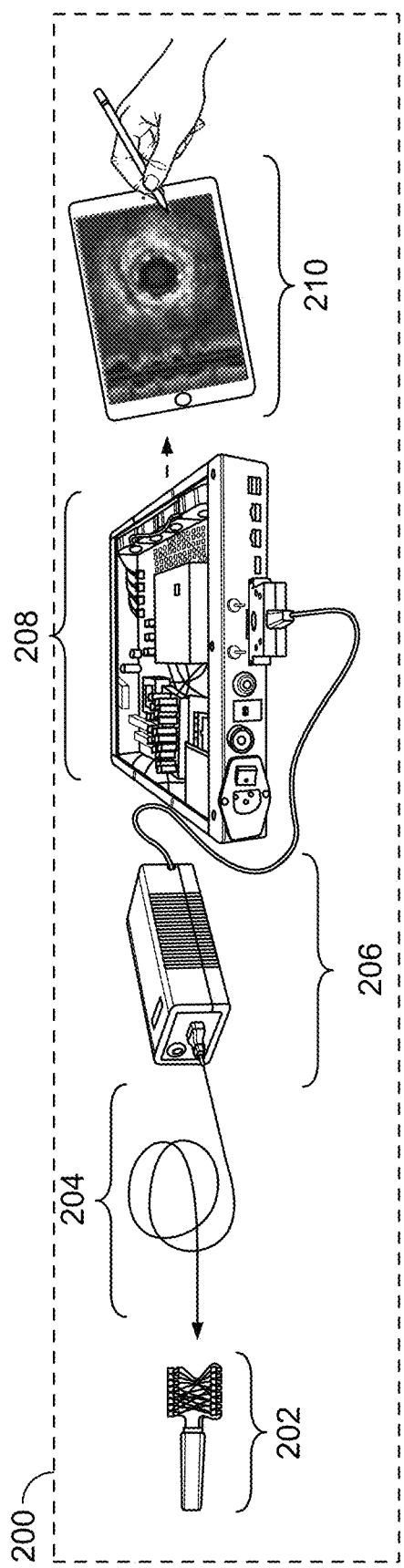
FIG. 2 illustrates an example ultrasound imaging system that can be used in the catheter laboratory of FIG. 1.

FIG. 2 illustrates an ultrasound imaging system 200. As shown in FIG. 2, the ultrasound imaging system 200 includes an imaging assembly 202, one or more wires 204, a patient interface module 206, an imaging engine 208, and a display computer or tablet 210. In certain embodiments, the imaging assembly 202 is the imaging assembly 300 that will be described in more detail below with reference to FIGS. 5-9. In alternative embodiments, the imaging assembly 202 is the imaging assembly 1300 that will be described in more detail below with reference to FIGS. 11-14.

As will be described in more detail, the imaging assembly 202 includes at least an ultrasound transducer array (see, for example, the ultrasound transducer array 320 in FIG. 5 and the ultrasound transducer array 1320 in FIG. 11). The ultrasound transducer array converts electrical signals into ultrasound signals, and converts reflected ultrasound signals into electrical signals that can be used to image a target. For example, by measuring the time between sending an ultrasound signal and receiving an echo, the distance of an object can be calculated. In certain embodiments, the ultrasound transducer array is a micro-electro-mechanical system (MEMS) transducer. In certain embodiments, the imaging assembly 202 can also include additional sensors that can detect and receive physiological data such as the pressure sensor 330 shown in FIG. 5.

In the example of FIG. 2, the imaging assembly 202 is operatively connected to the patient interface module 206 by the one or more wires 204 that can be inserted through a catheter or needle. As will be described in more detail, the patient interface module 206 uploads a transmit-receive sequence and operational codes (opcodes) to a memory of the imaging assembly 202 such that the imaging assembly 202 is programmable to operate a variety of different types of ultrasound scanning modalities.

The patient interface module 206 is operatively connected to the imaging engine 208. The patient interface module 206 can relay ultrasound signal data from the imaging assembly 202 to the imaging engine 208, and the imaging engine 208 can process the ultrasound signal data to produce real-time ultrasound images. The patient interface module 206 can relay additional data from the imaging assembly 202 to the imaging engine 208 such as physiological data and tracking data that can be processed by the imaging engine 208 for display along with the real-time ultrasound image.

The patient interface module 206 can relay instructions from the imaging engine 208 to the imaging assembly 202 during performance of an image capture sequence in real-time. For example, the imaging engine 208 can vary the gain provided by a low-noise amplifier (LNA) that is included on the imaging assembly 202 to reduce power consumption on the imaging assembly 202, and thereby reduce the heat generated by the imaging assembly 202 during the image capture sequence.

Additionally, the imaging engine 208 can vary in-real-time the transmit repetition rate or period of the transmit-receive sequences performed by the imaging assembly 202 during the image capture sequence to extend or contract the field of view or increase or decrease the frame rate. Advantageously, varying in-real-time the transmit-receive sequences performed by the imaging assembly 202 can help to increase the frame rate of the ultrasound images when desirable for a clinical application, or alternatively increase the image quality and depth of the ultrasound images when desirable.

Also, the imaging engine 208 can vary in real-time a transmit voltage and frequency directed to the ultrasound transducer array of the imaging assembly 202 during the image capture sequence. Furthermore, the imaging engine 208 can vary the length of the receive window, which varies the time the low-noise amplifier (LNA) is powered on and the amount of heat generated by imaging assembly 202. The imaging engine 208 can further adjust the timing and operation of a transmit/receive switch 406 (see FIG. 6) on the imaging assembly 202 to reduce near-field artifacts or increase near-filed response.

Additionally, the imaging engine 208 can receive a cyclic redundancy check signal from the imaging assembly 202 that can identify whether there was an error in uploading the transmit-receive sequence and opcodes to the programmable memory of the imaging assembly 202. These concepts will be described in more detail below.

As further shown in FIG. 2, the display computer or tablet 210 is operatively connected to the imaging engine 208 by one or more wired, fiber optic, or wireless connections, or combinations thereof. The imaging engine 208 provides the real-time ultrasound image, and physiological and tracking data for display and analysis on the display computer or tablet 210. In certain embodiments, the display computer or tablet 210 is portable device such as a tablet computer or smartphone device.

Figure 3:
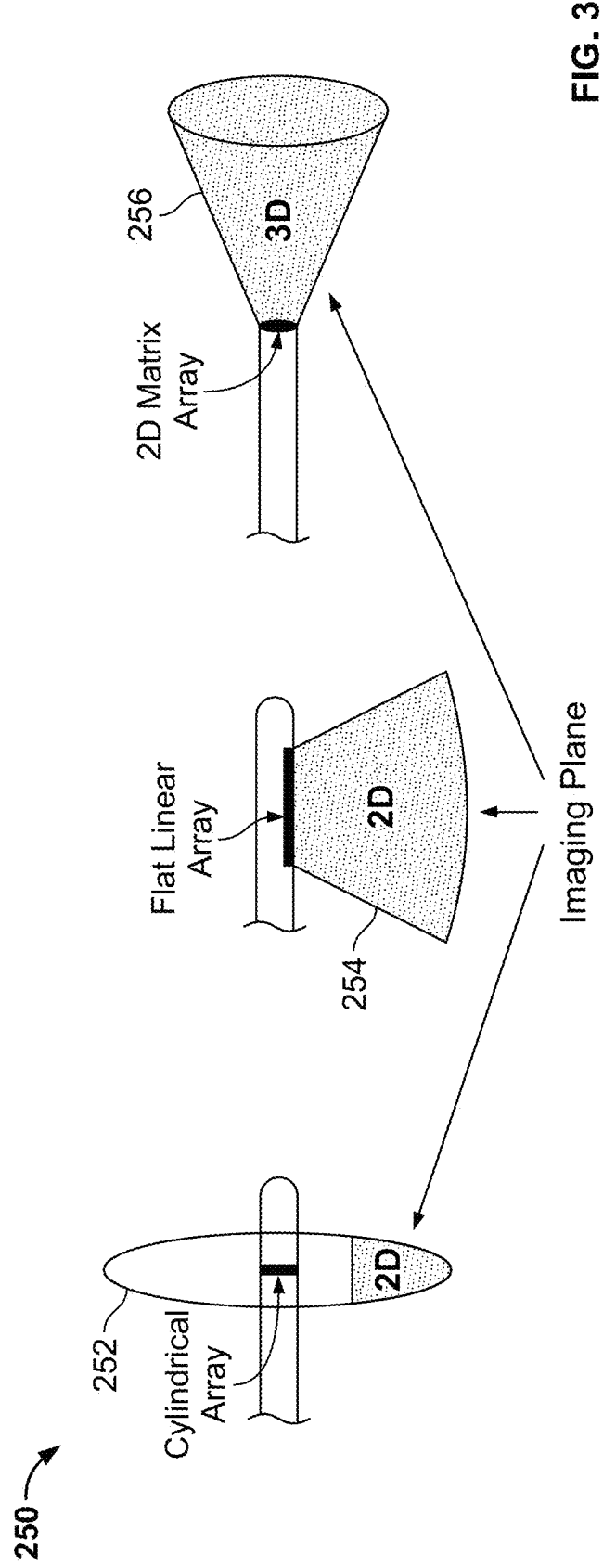
FIG. 3 illustrates example ultrasound scanning modalities that the ultrasound imaging system of FIG. 2 can be configured and programmed to perform.

FIG. 3 shows ultrasound scanning modalities 250 that the imaging assembly 202 can be assembled and programmed to perform. The ultrasound scanning modalities 250 can include a cylindrical ultrasound scanning modality 252, a side ultrasound scanning modality 254, or a forward looking 3D ultrasound scanning modality 256.

The imaging assembly 202 is assembled and programmed to perform an ultrasound scanning modalities 250 based on a desired clinical application. For example, the imaging assembly 202 can be assembled and programmed to perform the cylindrical ultrasound scanning modality 252 when it is desirable to scan inside a lumen such as an artery. The imaging assembly 202 can be assembled and programmed to perform the side ultrasound scanning modality 254 when it is desirable to scan a surface such as a wall of the heart cavity. The imaging assembly 202 can be assembled and programmed to perform the forward looking 3D ultrasound scanning modality 256 when it is desirable to scan a closed off area that the imaging assembly 202 is not able to pass through.

Initially, the imaging assembly 202 can be assembled to perform one of the example ultrasound scanning modalities 250, and thereafter the patient interface module 206 can be used to upload a transmit-receive sequence and opcodes to a memory of the imaging assembly 202 to program the imaging assembly 202 for performing the ultrasound scanning modality based on a clinical application.

As an illustrative example, the imaging assembly 202 can be assembled to perform the cylindrical ultrasound scanning modality 252, and the transmit-receive sequence and opcodes can optimize the performance of the cylindrical ultrasound scanning modality 252 by the imaging assembly 202. For example, the transmit-receive sequence and opcodes can optimize a sub-aperture size of an ultrasound transducer array on the imaging assembly 202 based on a clinical application. A synthetic aperture ultrasound imaging system that can adjust a sub-aperture size of an ultrasound transducer array is described in U.S. patent application No. 62/989,268 filed on Mar. 13, 2020, which is hereby incorporated by reference in its entirety.

As a further example, a sub-aperture for performing the cylindrical ultrasound scanning modality 252 can be optimized to increase the number of receive elements within the sub-aperture to improve quality of the ultrasound images when desirable. Alternatively, the sub-aperture for performing the cylindrical ultrasound scanning modality 252 can be optimized to decrease the number of receive elements within the sub-aperture to increase the frame rate of the ultrasound images when desirable.

As another illustrative example, the sub-aperture can be decreased for performing the cylindrical ultrasound scanning modality 252 when an increased frame rate is desirable such as when imaging leaflet motion inside a valve of a heart. Alternatively, the sub-aperture can be increased when improved image quality is desirable. The programmable sub-aperture for performing the cylindrical ultrasound scanning modality 252 will be described in more detail below with reference to FIGS. 17-20.

Figure 4:
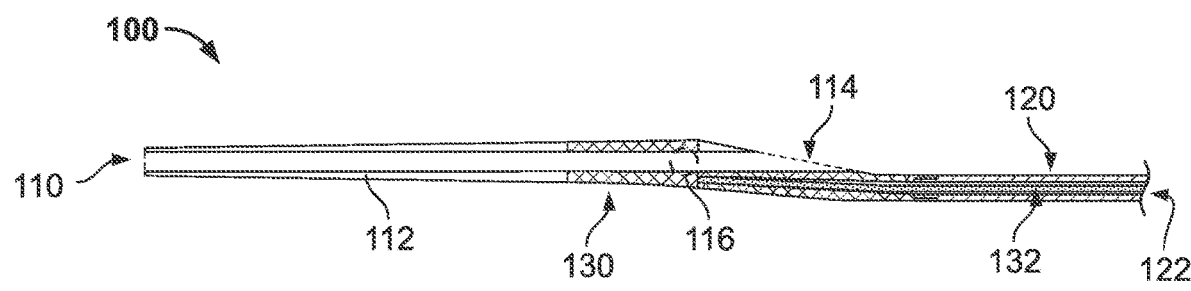
FIG. 4 is a partial sectional side view of an example IVUS imaging and pressure sensing catheter that can be used by the ultrasound imaging system of FIG. 2.

FIG. 4 is a partial sectional view of a distal end of an example IVUS imaging and the catheter 100. For illustrative purposes only, some embodiments of the catheter 100 are appropriate for intracoronary catheters. However, the described embodiments of the catheter 100 are not limited to intracoronary catheters, and accordingly may be used in other types of catheters, endoscopes, and similar devices.

In the example embodiment shown, the catheter 100 includes a distal tip 110, a distal shaft 120, a sensor assembly section 130, and a cable harness 132. The distal tip 110 may include a tapered, elongated tube 112 having at least one layer. The distal tip 110 further includes a guide wire lumen 114 and a side port 116. In certain embodiments, the catheter 100 and sensor assembly section 130 are disposable after a single use.

In certain embodiments, the distal tip 110 has an inner diameter suitable for an 0.014 inch guide wire. For example, the distal tip 110 can have an inner diameter of about 0.0165 inches. The distal tip wall may taper from a proximal outer diameter between about 0.003 inches and about 0.009 inches to a distal outer diameter between about 0.001 inches and about 0.003 inches. The distal tip 110 can have a length suitable for tracking along the guide wire. For example, in some embodiments, the distal tip 110 can have a length between about 5 mm and about 30 mm.

In certain embodiments, the distal tip 110 is made from Pebax® material. The distal tip 110 may also include an inner liner made of high-density polyethylene (HDPE) or polytetrafluoroethylene (PTFE) to reduce friction between the distal tip and a guide wire (not shown). The side port 116 enables fluid communication between a blood-filled coronary artery and at least a portion of the sensor assembly section 130. A radiopaque marker band (not shown) composed or platinum or iridium may be included in the distal tip 110 to aid visualization of the catheter in x-ray angiographic images.

The distal tip 110 is bonded to the distal shaft 120. The distal shaft 120 can include a proximal end, a distal end, and a length extending between the proximal and distal ends. The distal shaft 120 can include any suitable material capable of having different flexural moduli along the shaft's length. In some embodiments, the distal shaft 120 includes a hypotube. The hypotube may be a spiral-cut, stainless steel hypotube.

The distal shaft 120 further includes a lumen 122. The distal shaft 120 may further include a polymer jacket and a liner to seal the lumen 122 from the external blood-filled coronary artery. The distal shaft 120 has an outer diameter that is sufficiently small to minimize effects on coronary artery blood flow when the catheter 100 is inside a coronary artery. The outer diameter of the distal shaft 120 is preferably 0.018 inches or smaller. The inner diameter of the distal shaft may be 0.016 inches or smaller.

Figure 5:
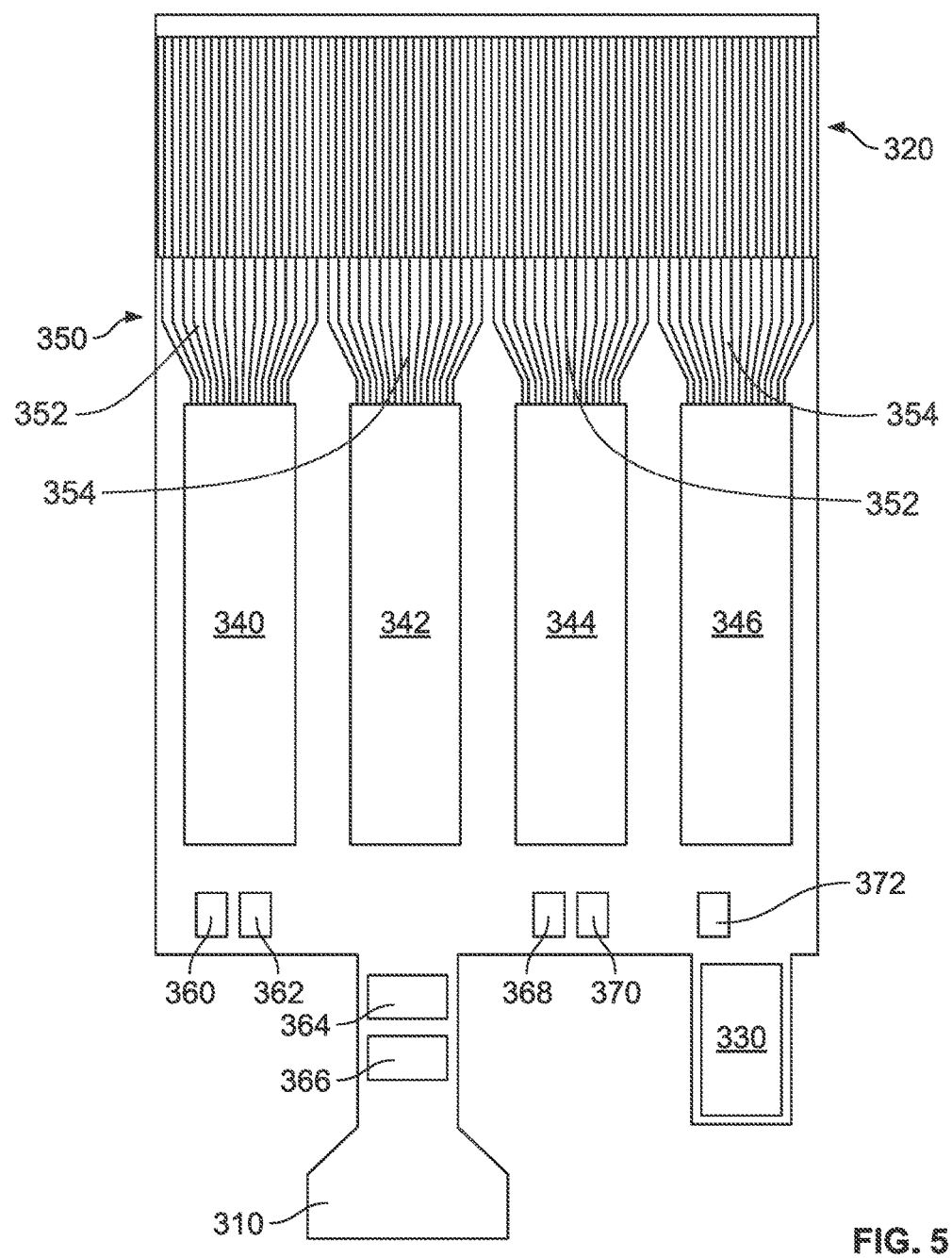
FIG. 5 is a top view of an example imaging assembly for the catheter of FIG. 4, the imaging assembly is shown before forming.
Figure 8:
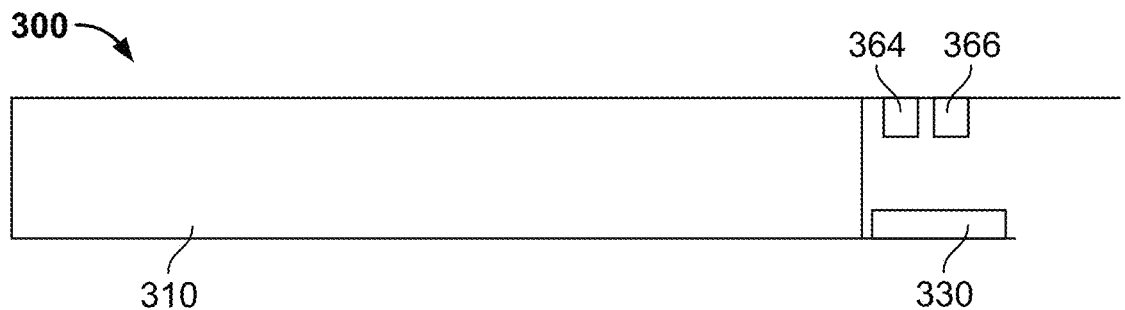
FIG. 8 is a side view of the imaging assembly of FIG. 5 after forming.
Figure 9:
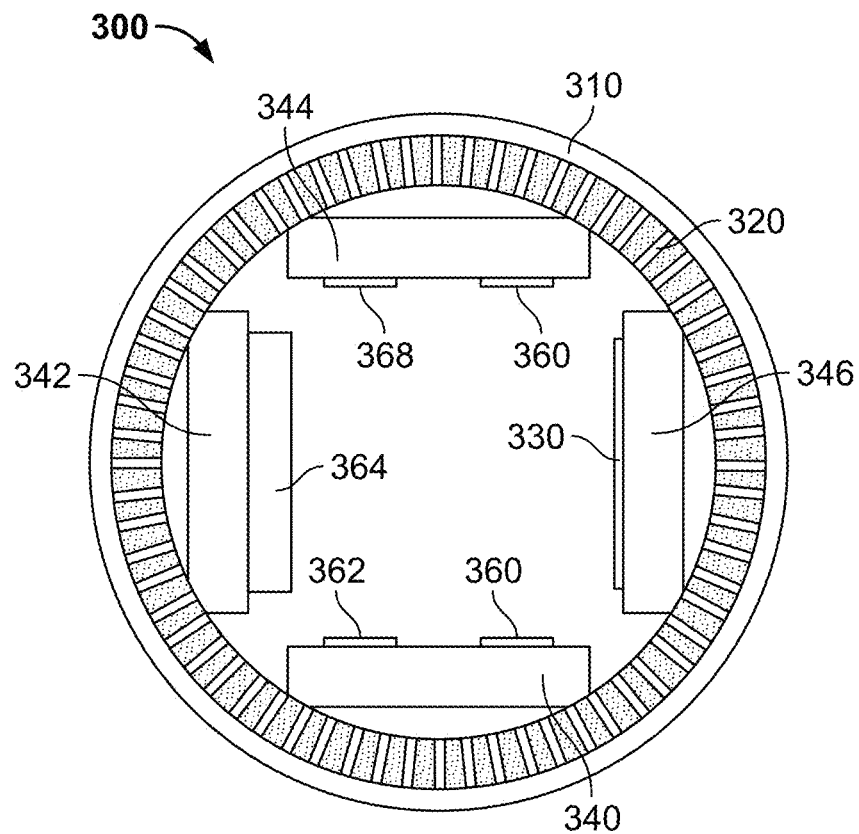
FIG. 9 is an end view of the imaging assembly of FIG. 5 after forming.

FIG. 5 is a top view of an example imaging assembly 300 before forming. FIGS. 8 and 9, which will be described in more detail below, show the imaging assembly 300 after forming. In certain embodiments, the imaging assembly 300 can be included as a part of the sensor assembly section 130 of the catheter 100 shown in FIG. 4. In certain embodiments, the imaging assembly 300 is assembled and configured to perform the cylindrical ultrasound scanning modality 252 shown in FIG. 3.

The pre-formed imaging assembly 300 includes a flexible substrate 310, an ultrasound transducer array 320, a pressure sensor 330, and mixed-signal integrated circuits (ICs) 340, 342, 344, 346. The pre-formed imaging assembly 300 further includes circuit traces 350, and a plurality of capacitors such as capacitors 360, 362, 364, 366, 368, 370, 372. This chip-on-flex design provides technical advantages including geometrical and mechanical flexibility that is important for catheter applications.

The flexible substrate 310 is a laminated structure that includes a coverlay, at least one electrical insulating layer, electrically conductive features, and adhesives. The coverlay and at least one insulating layer can be made of polyimide. A polyimide layer may be as thin as approximately 12 µm. The electrically conductive features, such as circuit traces 350, can be etched from copper foils as thin as about 10 µm thick, or can be vapor deposited copper of about 2-4 µm thick, vapor deposited nickel of about 2-4 µm thick, or vapor deposited gold of about 0.5 µm thick. The flexible substrate 310 includes electrical contacts such as pads for die (chip) attachment of components for the mixed-signal ICs 340, 342, 344, 346.

The ultrasound transducer array 320 includes an array of 64 elements wherein each element includes a piezoelectric layer such as lead zirconate titanate (PZT). The ultrasound transducer array 320 can be formed by bonding the piezoelectric layer to the flexible substrate 310. In some embodiments, the piezoelectric layer may have a resonant frequency between about 10 MHz and about 30 MHz. In certain embodiments, the piezoelectric layer may have a resonant frequency of about 20 MHz. The dimensions of the piezoelectric layer are approximately 3.2 mm by 1 mm by 0.09 mm. The piezoelectric layer can be diced to form 64 elements that are approximately 50 μm wide. The kerf width (or distance between elements) can be approximately 12 μm.

In some embodiments, the ultrasound transducer array 320 is a microelectromechanical system (MEMS) transducer that is fabricated using one or more types of semiconductor processes, with interconnecting traces such that the imaging assembly 300 does not include the flexible substrate 310. Instead, one or more of the mixed-signal ICs 340, 342, 344, 346 are bonded to the MEMS transducer, and thereby form a multi-chip module using a stacked die assembly approach.

In some embodiments the pressure sensor 330 is a piezoresistive pressure die that has dimensions of approximately 0.9 mm (length) by 0.33 mm (width) by 0.18 mm (height). The piezoresistive pressure die includes two piezoresistors, or a half bridge of a Wheatstone bridge. In some embodiments, the bridge resistance is between about 2000Ω and about 3500Ω. In certain embodiments, the bridge resistance is about 3200Ω. Two matched bridge additional 3000Ω resistors, which are internal components of mixed signal ICs 340, 342, 344, 346, are connected to the piezoresistive pressure die to complete the full-bridge configuration. In some embodiments, the pressure sensor 330 is powered by a voltage in a range of about 1 V to about 6 V. In certain embodiments, the pressure sensor 330 is powered by a voltage of approximately 3 V.

Figure 6:
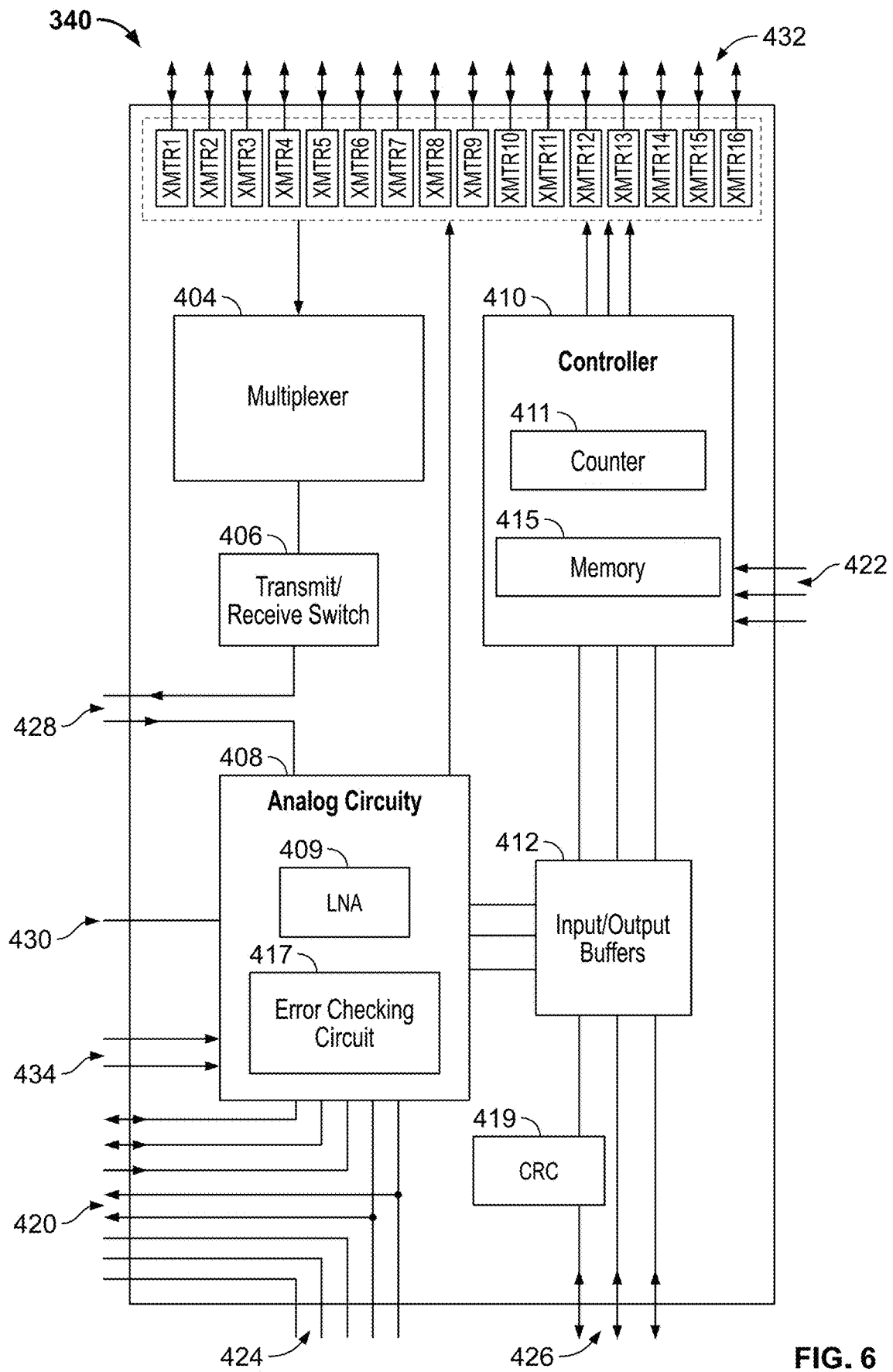
FIG. 6 is a schematic diagram of an example integrated circuit for the imaging assembly shown in FIG. 5.

FIG. 6 shows the mixed-signal IC 340 in greater detail. While the mixed-signal IC 340 is shown and described as being used in the imaging assembly 300 which is assembled and configured to perform the cylindrical ultrasound scanning modality 252, it is contemplated that the mixed-signal IC 340 can be used in additional types of imaging assemblies such as ones that are assembled and configured to perform the side ultrasound scanning modality 254, or the forward looking 3D ultrasound scanning modality 256.

As shown in FIG. 6, the mixed-signal IC 340 includes a set of transmitters 402, a multiplexer 404, a transmit/receive switch 406, analog circuitry 408, a controller 410, and input/output buffers 412. In some embodiments, the multiplexer 404 is a 16:1 receiver multiplexer that multiplexes 16 transducer array elements.

The mixed-signal IC 340 includes interfaces for power and data pins 420 to the patient interface module 206 which is programmed and powered by the imaging engine 208 (see FIG. 2). The mixed-signal IC 340 also includes board-level strapping pins 422, connectivity pins 424 to the other mixed-signal ICs 342, 344, 346, communication pins 426 to the other mixed-signal ICs 342, 344, 346, capacitor pins 428, a low-voltage power supply pin 430, a set of transducer element pins 432 to the ultrasound transducer array 320, and piezoresistive bridge pins 434 to the pressure sensor 330.

The transmit/receive switch 406 is capacitively coupled to the analog circuitry 408. The analog circuitry 408 includes a low-noise amplifier (LNA) 409. The LNA 409 is configurable to provide gain to the ultrasonic signals received from the ultrasound transducer array 320 via the transducer element pins 432. In certain examples, the LNA 409 is a receiver amplifier implemented on the mixed-signal IC 340.

The analog circuitry 408 is configured to vary the voltage and current on the LNA 409 to reduce the power consumption on the mixed-signal IC 340 for certain applications of the imaging assembly 300. For example, the gain and compression point on the LNA 409 can be varied to manage the power consumption of the LNA 409. In certain embodiments, the gain on the LNA 409 can be varied to reduce power consumption on the mixed-signal IC 340 from about 3 V to about 2.7 V. Advantageously, reducing the power consumption of the LNA 409 can reduce the amount of heat generated by the mixed-signal IC 340. Alternatively, increasing the gain on the LNA 409 (and thereby increasing the power consumption of the LNA 409) can be advantageous in applications where additional amplification is beneficial and heat generation is not a concern. In certain embodiments, the gain (and power consumption) of the LNA 409 is managed by the controller 410, which is programmed by an external host system such as the imaging engine 208 via the patient interface module 206.

The controller 410 includes a counter 411 and a memory 415 that is programmable. The memory 415 is programmable to store a transmit-receive sequence and operational codes (opcodes) for execution by the controller 410 to complete an entire scan (frame) of image data. Once the imaging assembly 300 is assembled to perform a selected ultrasound scanning modality 250 such as the cylindrical ultrasound scanning modality 252, side ultrasound scanning modality 254, or forward looking 3D ultrasound scanning modality 256 (see FIG. 3), the memory 415 enables the mixed-signal IC 340 to be configurable to support the selected ultrasound scanning modality 250.

In certain embodiments, the memory 415 is a static random-access memory (SRAM) that can dynamically store the transmit-receive sequence and opcodes to configure the mixed-signal IC 340 to support the ultrasound scanning modality 250 selected for the assembled imaging assembly 300 such as the cylindrical ultrasound scanning modality 252, side ultrasound scanning modality 254, or forward looking 3D ultrasound scanning modality 256.

The transmit-receive sequence and opcodes are uploaded to the memory 415 via the power and data pins 420 which are connectable to the patient interface module 206 of FIG. 2. The transmit-receive sequence and opcodes can be configured to support a cylindrical array sequence or a linear array sequence by configuring the mixed-signal ICs 340, 342, 344, and 346, and by programming the SRAM. In some embodiments, the mixed-signal ICs 340, 342, 344, 346 are each separately configured to electrically excite 16 elements of the 64-element ultrasound transducer array in a predetermined order.

The transmit-receive sequence may also include "no operation" events. The no-operation (no-op) opcode combined with the counter 411 can reduce the size of the memory 415. The SRAM can have a storage of approximately 1024×10 bits for storing the transmit-receive sequence and opcodes. The no-op event can also disable each mixed-signal IC 340, 342, 344, 346 (i.e., to stand by) for a set of clock cycles tracked by the counter 411, which can further reduce the heat generated by the imaging assembly 300.

The power and data pins 420 provide power signals for high-voltage supply, low-voltage supply, and ground. The power and data pins 420 further provide analog signals for a high-speed low-voltage differential signaling (LVDS) to transmit signals and differential or single ended receive signals for ultrasound and pressure output signals.

The power and data pins 420 still further provide a digital signal for an input clock signal. The board-level strapping pins 422 provide digital signals to identify which chip is "master" and which chips are "slaves." The connectivity pins 424 provide pass-throughs for the power signals for high-voltage supply, low-voltage supply, ground, and for receive signals such as the ultrasound output signals.

The communication pins 426 provide a pass-through for the digital clock signal, a pass-through a digital transmit signal, and a cyclic redundancy check (CRC) signal 419. The CRC signal 419 enables each mixed-signal IC to report events where the transmit-receive sequence and operational codes in SRAM is incorrect.

The CRC signal 419 is generated by an error checking circuit 417 that uses the DC bias of the differential signaling to perform an error check. For example, a pair of differential transmit signals can be biased by a voltage of a predetermined amount, and the error checking circuit 417 can pull one differential signal to zero to determine whether an error has occurred. Advantageously, the CRC signal 419 can report to an external host system, such as the patient interface module 206 of FIG. 2, that there is an error without having to use a dedicated transmission line on the mixed-signal IC 340 or additional circuits within mixed-signal ICs 340, 342, 344, and 346 to enable bi-directional communication over a single transmission line or wire.

The high-voltage supply provided from the power and data pins 420 can be varied to adjust the transmit voltage of transmitters XMTR1-XMTR16. For example, the high-voltage supply on the mixed-signal ICs 340, 342, 344, and 346 can be increased to provide a more powerful transmission from the transmitters XMTR1-XMTR16, or can be decreased to provide a less powerful transmission from the transmitters XMTR1-XMTR16. In some embodiments, the high-voltage supply can be varied between about 8 V and about 20 V. In certain examples, the high-voltage supply can be set at about 15 V.

The low-voltage supply provided from the power and data pins 420 can also be varied during operation of the imaging assembly 300. For example, the low-voltage supply can be decreased to reduce the power consumption of the LNA 409. In some embodiments, the low-voltage supply can be varied between about 2.7 V and about 3 V. In certain embodiments, the low-voltage supply can be set at about 3 V.

The clock signal provided from the power and data pins 420 can also be varied during operation of the imaging assembly 300. For example, the clock signal can be varied to increase or decrease the frequency of the transmit-receive sequences. In some embodiments, the clock signal can be varied between about 10 kHz and about 120 kHz. In certain embodiments, the clock signal operates can be set at about 54 kHz.

In the example embodiment illustrated in the figures, the set of transmitters 402 includes 16 transmitters that each connect to one of the transducer element pins 432 and an ultrasound transducer element of the ultrasound transducer array 320. The programming of the mixed-signal ICs 340, 342, 344, and 346 by the patient interface module 206, causes the multiplexer 404, transmit/receive switch 406, analog circuitry 408, and controller 410 to follow a predetermined sequence of transmit and receive events for the transducer array elements of the ultrasound transducer array 320.

The transmit/receive switch 406 can be programmed to switch through three states to precisely control when, relative to the transmit event, the receiver is enabled to minimize near-field imaging artifacts, such as near-field artifacts. The first state enables the multiplexer 404 output, the second state places the transmitter 402 into a high impedance state, the third state releases a weak pulldown on the receiver output, which initiates the beginning of the receive window. In an example embodiment in which the imaging assembly 300 performs synthetic aperture imaging, the mixed-signal IC 340 transmits on a first transmitter XMTR1 and is configured to receive sequentially on all 16 transducer elements. In some embodiments, the transmitter output is between about 8 V and about 20 V. In certain embodiments, the transmitter output is about 15 V.

The transmitter (e.g., XMTR1) may generate a series of monopolar pulses, such as a single pulse or a double pulse. In some embodiments, the pulse width is between about 10 ns and about 100 ns. In certain embodiments, the pulse width is about 20 ns. In some embodiments, the delay between double pulses is between about 15 ns and about 100 ns. In certain embodiments, the delay between double pulses is about 20 ns. The sequence is then repeated for the remaining transmitters (e.g., XMTR2 to XMTR16).

The sequence may further include receiving signals from transducer elements connected to another mixed-signal IC. The size of the mixed-signal IC 340 is approximately 2.0 mm by 0.5 mm by 0.1 mm to enable use in small imaging and sensing catheters that are approximately 3 F (1 mm diameter) in size.

It can be advantageous for a minimally invasive image guidance device, such as a catheter or endoscope, to reduce the number of transmission lines, and thereby reduce the size of the device for insertion into a human body. However, a disadvantage is that normal organ motion, such as cardiac and respiratory movements, can result in undesirable motion artifacts in cases where a synthetic imaging sequence may not be sufficiently short in duration to temporally resolve the motion.

The mixed-signal IC 340 can overcome these challenges by being programmable to increase or decrease a sub-aperture size of the ultrasound transducer array 320 as needed. By enabling the mixed-signal IC 340 to be programmable to increase or decrease the sub-aperture size, the acquisition time and motion artifacts can be minimized, while also minimizing the size of the catheter or endoscope device.

Additionally, the mixed-signal IC 340 can overcome the above-identified challenges either by being grouped together with other mixed-signal ICs to share a single receive channel such as for cylindrical imaging and small sub-apertures (less than ¼ of the total number of transducer array elements of the ultrasound transducer array 320), or by separately interfacing each mixed-signal IC to its own receive channel for a side ultrasound scanning modality 254 where all transducer array elements of the ultrasound transducer array 320 are used to form the image such that there is no sub-aperture, or by a combination of groupings mixed-signal ICs and independent receive channels.

Figure 7:
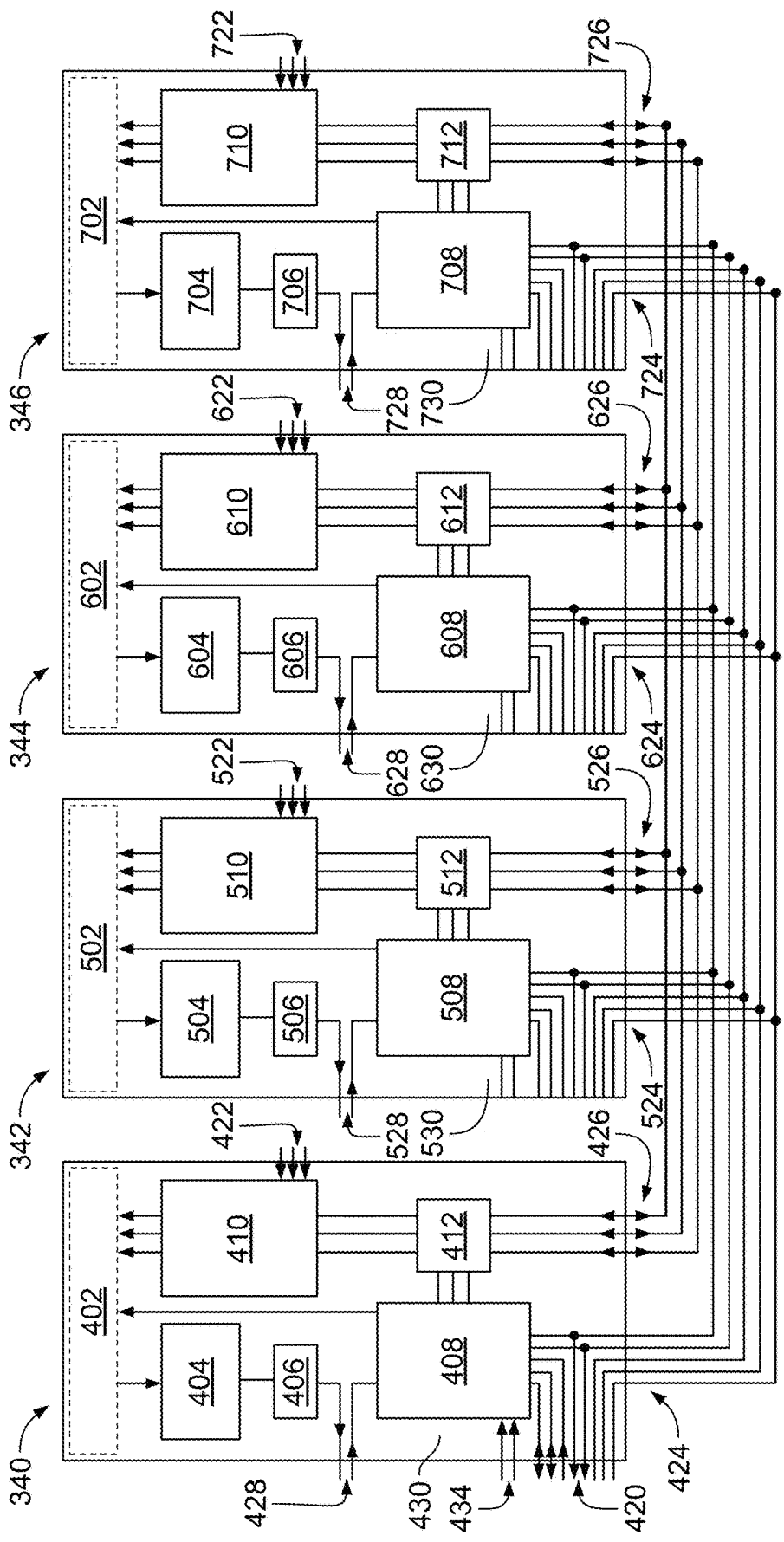
FIG. 7 is a schematic diagram of an example of multiple connected integrated circuits of the imaging assembly of FIG. 5.

Referring now to FIG. 7, a schematic diagram of connections between the multiple mixed-signal ICs 340, 342, 344, 346 is shown. According to some embodiments, the mixed-signal IC 340 is defined to be the "master" IC by setting the board-level strapping pins 422 to low voltage (or "000") and the other mixed-signal ICs are defined by setting the board-level strapping pins to be "slave" ICs by setting the board-level strapping pins 522 to be "001" for mixed-signal IC 342, the board-level strapping pins 622 to be "010" for mixed-signal IC 344, and the board-level strapping pins 722 to be "011" for mixed-signal IC 346.

The hardware of each mixed-signal IC 340, 342, 344, 346 is identical. Similar to mixed-signal IC 340, mixed-signal IC 342 includes a set of transmitters 502, a 16:1 receiver multiplexer 504, a transmit/receive switch 506, analog circuitry 508, a controller 510, and input/output buffers 512. The mixed-signal IC 342 further includes the board-level strapping pins 522, connectivity pins 524 to the other mixed-signal ICs 340, 344, 346, communication pins 526 to the other mixed-signal ICs 340, 344, 346, capacitor pins 528, and a low-voltage power supply pin 530.

Mixed-signal IC 344 includes a set of transmitters 602, a 16:1 receiver multiplexer 604, a transmit/receive switch 606, analog circuitry 608, a controller 610, and input/output buffers 612. The mixed-signal IC 344 further includes the board-level strapping pins 622, connectivity pins 624 to the other mixed-signal ICs 340, 342, 346, communication pins 626 to the other mixed-signal ICs 340, 342, 346, capacitor pins 628, and a low-voltage power supply pin 630.

Mixed-signal IC 346 includes a set of transmitters 702, a 16:1 receiver multiplexer 704, a transmit/receive switch 706, analog circuitry 708, a controller 710, and input/output buffers 712. The mixed-signal IC 346 further includes the board-level strapping pins 722, connectivity pins 724 to the other mixed-signal ICs 340, 342, 344, communication pins 726 to the other mixed-signal ICs 340, 342, 344, capacitor pins 728, and a low-voltage power supply pin 730.

The connectivity pins 424, 524, 624, 724 of the mixed-signal ICs 340, 342, 344, 346 provide the power signals for high-voltage supply, low-voltage supply, and ground. The connectivity pins 424, 524, 624, 724 further provide the receive signal for ultrasound signal from the master mixed-signal IC 340 and slave mixed-signal ICs 342, 344, 346 when a common differential transmission line is connected to the imaging assembly 300. The imaging assembly 300 can be connected via a common differential transmission line to the IVUS imaging and pressure sensing console 90.

The analog circuitries 408, 508, 608, 708 are connected to the common differential transmission line to the imaging engine 208 via the patient interface module 206 of FIG. 2. The analog circuitries 408, 508, 608, 708 alternate driving the common differential transmission line. The analog circuitries 408, 508, 608, 708 each include a low-noise amplifiers (LNA) 409 that is configurable to provide a variable gain to the ultrasonic signals that are received from the transducer array elements of the ultrasound transducer array 320. This is advantageous because signal loss can result from the transmit/receive switch 406 and from transfer on the common differential transmission line to the external host. The LNA 409 boosts the ultrasound signals received on each mixed-signal IC 340, 342, 344, 346, and thereby improves the signal-to-noise ratio of the ultrasound signals received from the imaging assembly 300.

The master mixed-signal IC 340 is further configured to multiplex the output signal of the pressure sensor 330 on the same differential transmission line that is used for the ultrasound transducer array signals. The communication pins 426, 526, 626, 726 of the mixed-signal ICs 340, 342, 344, 346 provide the digital clock signal, the digital transmit signal, and cyclic redundancy check (CRC) signals.

FIG. 8 is a side view of an example of the imaging assembly 300 after forming. FIG. 9 shows an end view of the imaging assembly 300 after forming. Referring now to FIGS. 8 and 9, the flexible substrate 310 is rolled into a tubular structure that in certain examples is approximately 1 mm in diameter. Thus, the ultrasound transducer array 320 can have a circular shape as shown in FIG. 9. The central axis of the imaging assembly 300 after forming is substantially clear of interference. The imaging assembly 300 after forming can be integrated into the sensor assembly section 130 of the catheter 100 (see FIG. 4). In certain embodiments, the imaging assembly 300 can scan at a depth of about 3-4 cm with a frame rate of about 30 frames per second. In certain embodiments, the catheter 100 including the imaging assembly 300 are disposable after a single use.

Advantageously, the imaging assembly 300 after forming can transmit on any one of the transducer array elements of the ultrasound transducer array 320, and can receive on any other transducer array element of the ultrasound transducer array 320. For example, in embodiments where the ultrasound transducer array 320 includes 64 transducer array elements, and the imaging assembly 300 comprises the mixed-signal ICs 340, 342, 344, 346, each mixed-signal IC is configurable by a memory 415 to transmit on any one transducer array element of the 64 transducer array elements and receive on any one transducer array element of the 64 transducer array elements.

In some embodiments, the ultrasound signals that are received from a transducer array element of the ultrasound transducer array 320 can be multiplexed onto a single receiver channel. In alternative embodiments where the imaging assembly 300 includes four or more integrated circuits mounted on the substrate 310, more than one integrated circuit is operatively connected on a first receive line 352 to a first set of transducer array elements of the ultrasound transducer array 320, and more than one other integrated circuit is operatively connect on a second receive line 354 to a second set of transducer array elements. In certain embodiments, the first and second sets of transducer array elements are alternately arranged around a central axis of the imaging assembly 300 such as around the center of the end view of the imaging assembly 300 shown in FIG. 9.

As described, in certain embodiments the hardware of each mixed-signal IC 340, 342, 344, 346 is the same. Thus, in certain embodiments the imaging assembly 300 can include at least two pressure sensors that are mounted on the substrate 310, with a first pressure sensor being operatively connected to a first integrated circuit (e.g., mixed-signal IC 340) that multiplexes a pressure signal from the first pressure sensor onto the first receive channel, and a second pressure sensor being operatively connected to a second integrated circuit (e.g., mixed-signal IC 344) that multiplexes a pressure signal from the second pressure sensor onto the second receive channel.

In certain embodiments, the mixed-signal IC 340, 342, 344, 346 connected to the first set of transducer array elements are driven by a first differential transmitter signal and a clock signal, and the mixed-signal IC 340, 342, 344, 346 connected to the second set of transducer array elements are driven by a second differential transmitter signal and the clock signal, and the first and second differential transmittal signals are different.

Figures 17, 18, 19:
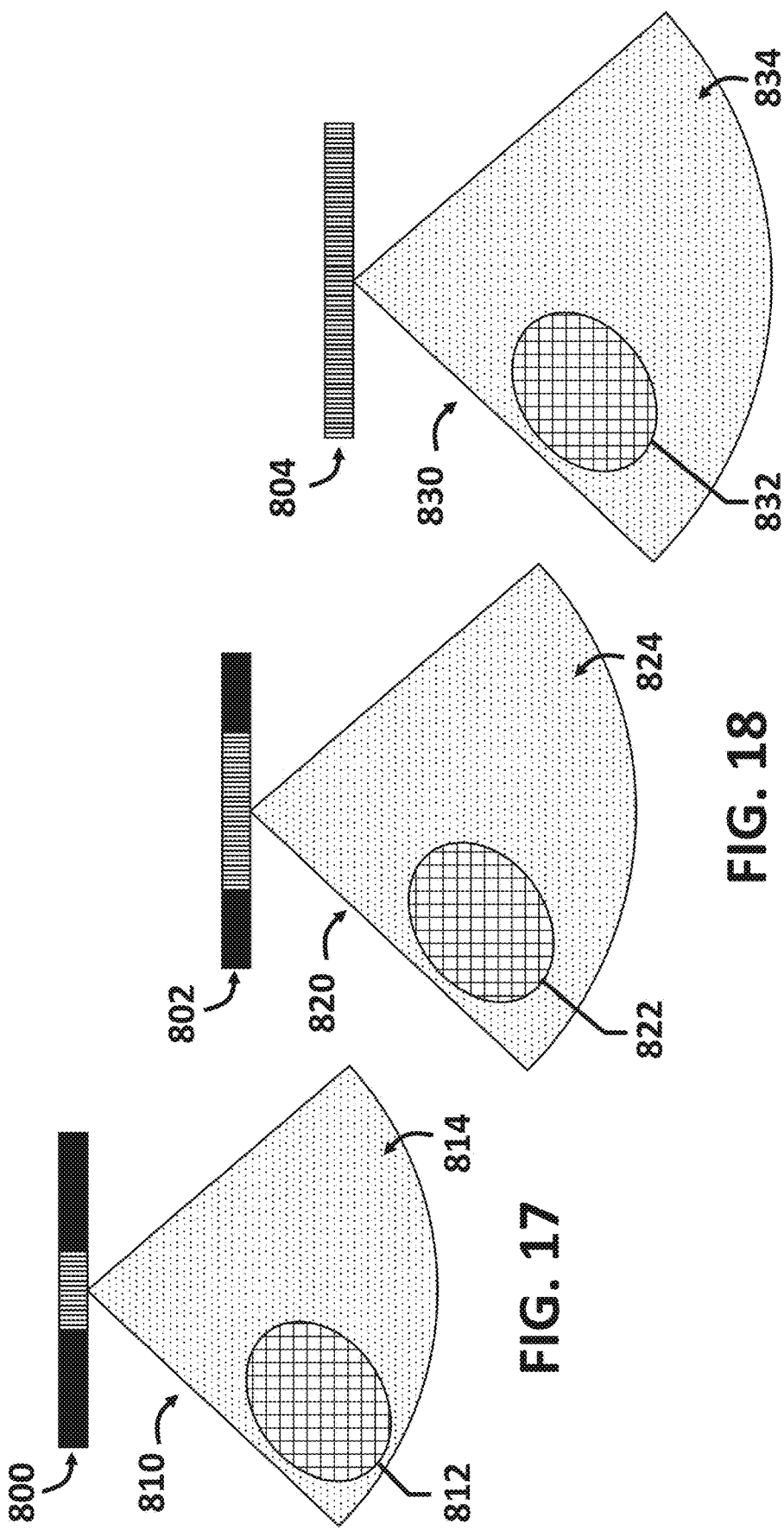
FIG. 17 illustrates a sub-aperture having a first size.
FIG. 18 illustrates a sub-aperture having a second size.
FIG. 19 illustrates a sub-aperture having a third size.

As described above, a sub-aperture for performing the cylindrical ultrasound scanning modality 252 by the imaging assembly 300 can be optimized by programming the mixed-signal IC 340, 342, 344, 346 to increase or decrease the number of transmit-receive elements within the sub-aperture of the ultrasound transducer array 320. FIG. 17 illustrates a first ultrasound image 810 of a target of interest 812 and a surrounding tissue 814 that is constructed using a sub-aperture having a first size 800. In certain embodiments, the sub-aperture having the first size 800 includes 16 elements. FIG. 18 illustrates a second ultrasound image 820 of a target of interest 822 and a surrounding tissue 824 that is constructed using a sub-aperture having a second size 802. In certain embodiments, the sub-aperture having the second size 802 includes 20 elements. FIG. 19 illustrates a third ultrasound image 830 of a target of interest 832 and a surrounding tissue 834 that is constructed using a sub-aperture having a third size 804. In certain embodiments, the sub-aperture having the third size 804 includes 24 elements.

The lateral resolution and depth of penetration of an ultrasound image generally increases with increasing sub-aperture size of the ultrasound transducer array 320. Thus, the third ultrasound image 830 that is constructed using sub-aperture having a third size 804 has a larger depth of penetration than the first and second ultrasound images 810, 820. However, the third ultrasound image 830 that is constructed using sub-aperture having a third size 804 has a slower frame rate for reproducing the ultrasound images.

The transmit-receive sequence and operational codes (op-codes) that are uploaded to the memory 415 of the mixed-signal IC 340 for execution by the controller 410 can program the imaging assembly 300 to have an optimum sub-aperture size for performing the cylindrical ultrasound scanning modality 252 for a desired clinical application.

Figure 10:
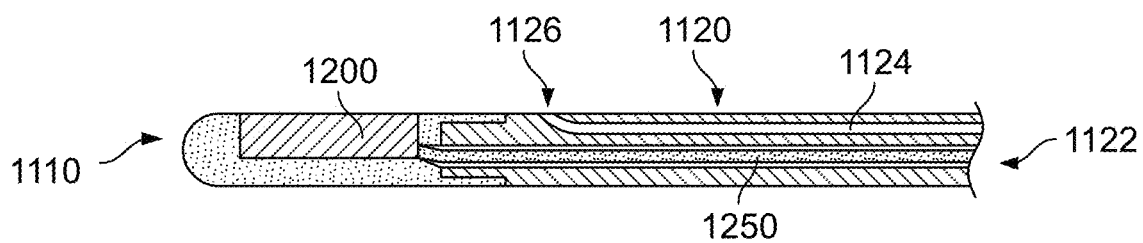
FIG. 10 is a partial sectional view of an example endobronchial ultrasound bronchoscope.

FIG. 10 is a partial sectional view of the distal end of an example endobronchial ultrasound (EBUS) bronchoscope 1100. In certain embodiments, the EBUS bronchoscope 1100 is assembled and configured to perform the side ultrasound scanning modality 254 shown in FIG. 3. Additionally, while some embodiments described herein with reference to the EBUS bronchoscope 1100 of FIG. 10 are appropriate for EBUS bronchoscopes, other embodiments can be used in applications other than an EBUS broncho-scope. The EBUS bronchoscope 1100 can be delivered to a bronchus passage or airway through the working channel of a diagnostic or therapeutic bronchoscope.

In the embodiment shown, the EBUS bronchoscope 1100 includes a distal tip 1110, a distal shaft 1120, a sensor assembly section 1200, and a cable harness 1250. In some embodiments, the distal tip 1110 has an outer diameter between about 1 mm and about 3 mm. In certain embodiments, the distal tip 1110 has an outer diameter of about 2 mm. The outer diameter of the EBUS bronchoscope is sufficiently small for delivery through the working channel of a diagnostic or therapeutic bronchoscope. In some embodiments, the distal tip 1110 has a length between about 5 mm and about 20 mm. In certain embodiments, the distal tip 1110 has a length of about 10 mm. The distal tip 1110 further includes an atraumatic tip to minimize trauma to the bronchi.

The distal tip 1110 is bonded to the distal shaft 1120. The distal shaft 1120 has a proximal end, a distal end, and a length extending between the proximal and distal ends. The distal shaft 1120 further includes a first lumen 1122, a second lumen 1124, and an exit port 1126. The distal tip 1110 includes the sensor assembly section 1200.

The sensor assembly section 1200 is coupled to the distal end of the cable harness 1250 that runs through the first lumen 1122. The proximal end of the cable harness 1250 can be connected to an external host system such as the imaging engine 208 via the patient interface module 206 shown in FIG. 2. The second lumen 1124 may be used as a working lumen, such as for delivery of a biopsy needle. The EBUS bronchoscope 1100 can provide ultrasound image guidance during needle biopsy of a bronchial lymph node, a medical procedure that is performed to determine the stage of lung cancer.

FIGS. 11 and 12 show top and bottom views of an example of an imaging assembly 1300 before forming. The imaging assembly 1300 can be included in the sensor assembly section 1200 that is shown in FIG. 10. As shown in FIGS. 11 and 12, the pre-formed imaging assembly 1300 includes a flexible substrate 1310, an ultrasound transducer array 1320, and mixed-signal ICs 1340, 1342, 1344, 1346.

The pre-formed imaging assembly 1300 has location features 1380, 1382 that can aid in positioning and trimming during the forming operation. The pre-formed imaging assembly 1300 can include a plurality of capacitors, such as capacitors 1360, 1362, 1364, 1366, 1368, 1370, 1372, 1374. This chip-on-flex design provides technical advantages including low device cost via mass production (up to approximately 120 assemblies within a five square inch substrate), and geometrical and mechanical flexibility which is helpful for bronchoscopy applications.

The flexible substrate 1310 is a laminated structure that can include a coverlay, at least one electrical insulating layer, electrically conductive features, and adhesives. At least one insulating layer can be made of polyimide. A polyimide layer may be as thin as approximately 12 μm. The electrically conductive features can be etched from copper foils as thin as about 5 μm thick, or vapor deposited copper of about 2-4 μm thick, vapor deposited nickel of about 2-4 μm thick, or vapor deposited gold of about 0.5 μm thick. The flexible substrate 1310 can include electrical contacts such as pads for die (chip) attachment of components for the mixed-signal ICs 1340, 1342, 1344, 1346, and capacitors 1360, 1362, 1364, 1366, 1368, 1370, 1372, 1374.

The ultrasound transducer array 1320 includes an array of 64 elements where each element includes at least one piezoelectric micromachined ultrasound transducer (pMUT). In some embodiments, the pMUTs have a resonant frequency between about 5 MHz and about 40 MHz. In certain embodiments, the pMUTs can have a resonant frequency of about 9.0 MHz. The dimensions of the ultrasound transducer array 1320 are approximately 8 mm by 1.5 mm by 0.1 mm. In some embodiments, the array pitch is between about 30 μm and about 150 μm. In certain embodiments, the array pitch is approximately 125 μm for a 9.0 MHz ultrasound transducer array.

Figure 13:
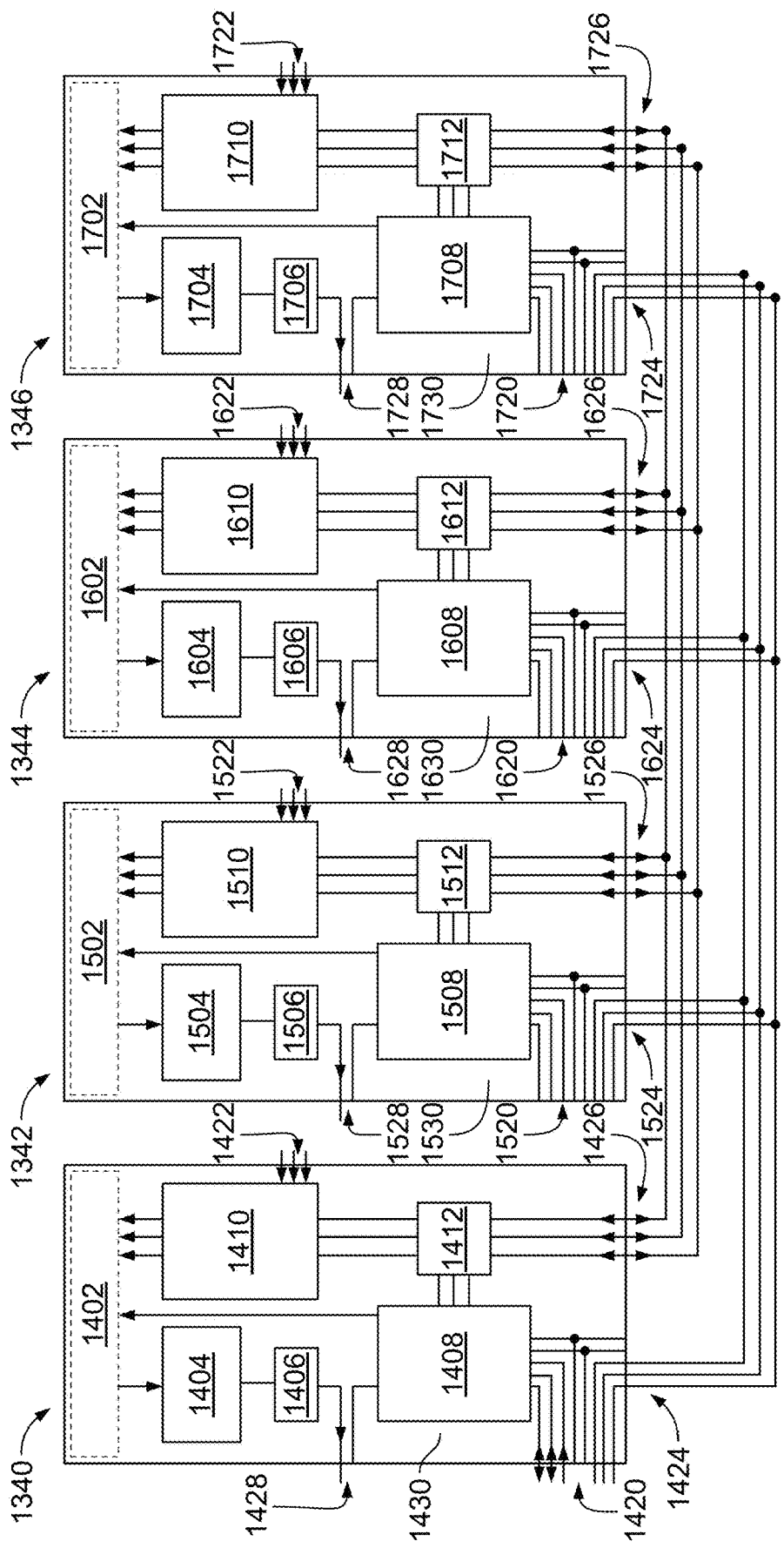
FIG. 13 is a schematic diagram of an example of multiple connected integrated circuits of the example imaging assembly of FIG. 11.

FIG. 13 schematically shows connections between the multiple mixed-signal ICs 1340, 1342, 1344, 1346. The mixed-signal ICs 1340, 1342, 1344, 1346 are similar to the mixed-signal integrated circuits (ICs) 340, 342, 344, 346 of the imaging assembly 300 described above with reference to FIGS. 5-9, and the mixed-signal IC 1340 can have the same components as the mixed-signal IC 340 shown in FIG. 6.

In some embodiments, the mixed-signal IC 1340 is defined to be the "master" IC by setting the board-level strapping pins 1422 to low voltage (or "000") and the other mixed-signal ICs are defined by setting the board-level strapping pins to be "slave" ICs by setting the board-level strapping pins 1522 to be "001" for mixed-signal IC 1342, the board-level strapping pins 1622 to be "010" for mixed-signal IC 1344, and the board-level strapping pins 1722 to be "011" for mixed-signal IC 1346.

The mixed-signal IC 1340 includes a set of transmitters 1402, a 16:1 receiver multiplexer 1404, a transmit/receive switch 1406, analog circuitry 1408, a controller 1410, and input/output buffers 1412. The mixed-signal IC 1340 further includes board-level strapping pins 1422, connectivity pins 1424 to the other mixed-signal ICs 1342, 1344, 1346, communication pins 1426 to the other mixed-signal ICs 1342, 1344, 1346, receive output pin 1428, and a low-voltage power supply pin 1430.

The mixed-signal IC 1342 includes a set of transmitters 1502, a 16:1 receiver multiplexer 1504, a transmit/receive switch 1506, analog circuitry 1508, a controller 1510, and input/output buffers 1512. The mixed-signal IC 1342 further includes board-level strapping pins 1522, connectivity pins 1524 to the other mixed-signal ICs 1340, 1344, 1346, communication pins 1526 to the other mixed-signal ICs 1340, 1344, 1346, receive output pin 1528, and a low-voltage power supply pin 1530.

The mixed-signal IC 1344 includes a set of transmitters 1602, a 16:1 receiver multiplexer 1604, a transmit/receive switch 1606, analog circuitry 1608, a controller 1610, and input/output buffers 1612. The mixed-signal IC 1344 further includes board-level strapping pins 1622, connectivity pins 1624 to the other mixed-signal ICs 1340, 1342, 1346, communication pins 1626 to the other mixed-signal ICs 1340, 1342, 1346, receive output pin 1628, and a low-voltage power supply pin 1630.

The mixed-signal IC 1346 includes a set of transmitters 1702, a 16:1 receiver multiplexer 1704, a transmit/receive switch 1706, analog circuitry 1708, a controller 1710, and input/output buffers 1712. The mixed-signal IC 1346 further includes board-level strapping pins 1722, connectivity pins 1724 to the other mixed-signal ICs 1340, 1342, 1344, communication pins 1726 to the other mixed-signal ICs 1340, 1342, 1344, receive output pin 1728, and a low-voltage power supply pin 1730.

The mixed-signal IC 1340 further includes interfaces for power and data pins 1420 to an external host system such as the imaging engine 208 via the patient interface module 206 shown in FIG. 2. The power and data pins 1420 provide power signals for high-voltage supply, low-voltage supply, and ground. The power and data pins 1420 further provide analog signals for a high-speed LVDS for transmit signals. The power and data pins 1420 still further provide a digital signal for an input clock signal.

The receive output pins 1428, 1528, 1628, 1728 of the mixed-signal ICs 1340, 1342, 1344, 1346 are each coupled to a single-ended transmission line. Use of the receive output pins 1428, 1528, 1628, 1728 of the mixed-signal ICs 1340, 1342, 1344, 1346 enables simultaneous measurements of received ultrasound signals from multiple ultrasound transducer elements. This can reduce the time to acquire an ultrasound image.

Additionally, ultrasound signals can be received from any one of the mixed-signal ICs 1340, 1342, 1344, 1346, or from multiple mixed-signal ICs, or from all of the mixed-signal ICs such that ultrasound signals can be received from any of the connected ultrasound transducer elements, one per mixed-signal IC. Multiple receive channels can be included, one for each mixed-signal IC, to increase the bandwidth of the imaging assembly 1300 and thereby reduces the time to acquire an ultrasound image.

The connectivity pins 1424, 1524, 1624, 1724 of the mixed-signal ICs 1340, 1342, 1344, 1346 provide power signals for high-voltage supply, low-voltage supply, and ground. The communication pins 1426, 1526, 1626, 1726 of the mixed-signal ICs 1340, 1342, 1344, 1346 provide digital clock signal, digital transmit signal, and CRC signals.

Figure 14:
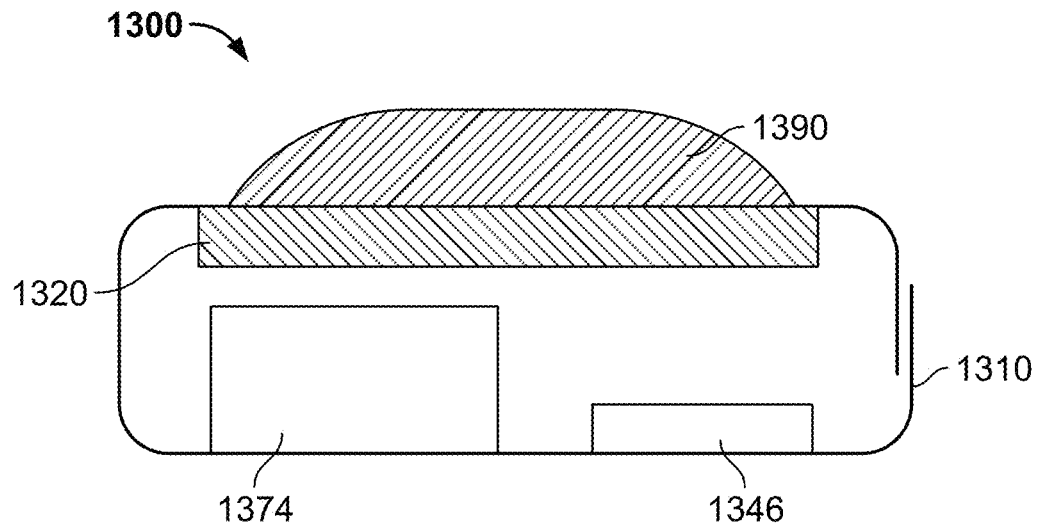
FIG. 14 is an end view of the imaging assembly of FIG. 11 after forming.

FIG. 14 shows an end view of the imaging assembly 1300 after forming. The flexible substrate 1310 is folded such that the imaging assembly 1300 has a rectangular cross-sectional shape, and the mixed-signal IC 1346 and capacitor 1374 are positioned below the ultrasound transducer array 1320. The ultrasound transducer array 1320 is encapsulated by a lens 1390 that protects the ultrasound transducer array 1320 from potential damage during use and provides focusing of the ultrasound energy to improve image performance. The imaging assembly 1300 after forming can be integrated into the sensor assembly section 1200 of the EBUS bronchoscope 1100 of FIG. 10.

The EBUS bronchoscope 1100 can be used with an external host system, such as the IVUS imaging and pressure sensing console 90 shown in FIG. 1, to guide a needle biopsy of a bronchial lymph node for lung cancer staging. The imaging assembly 1300 can be used to perform ultrasound imaging by acquiring a complete data set where all combinations of transmit and receive pairs for the 64-element array are processed. As an illustrative example, the mixed-signal IC 1340 transmits on a first transmit channel, and ultrasound signals are simultaneously received from a first receive channel on each of the mixed-signal ICs 1340, 1342, 1344, 1346. This transmit-receive sequence can be repeated for remaining receive channels of the mixed-signal ICs 1340, 1342, 1344, 1346. This sequence can be further repeated for each transmit channel of each mixed-signal IC.

Advantageously, the imaging assembly 1300 can transmit on one transducer array element of the ultrasound transducer array 1320, and simultaneously receive on four transducer array elements of the ultrasound transducer array 1320 (i.e., one transducer array element per mixed-signal IC 1340, 1342, 1344, 1346).

In some embodiments, the imaging assembly 1300 can be expanded to include eight mixed-signal ICs. In such embodiments, the imaging assembly 1300 can transmit on one transducer array element of the ultrasound transducer array 1320, and simultaneously receive on eight transducer array elements of the ultrasound transducer array 1320 (i.e., one transducer array element per mixed-signal IC).

The EBUS bronchoscope 1100 may utilize synthetic aperture imaging techniques to enable array imaging with a reduced number of transmission lines. This enables reduced size, reduced power consumption and heat generation, and reduced cost.

Additionally, a sub-aperture for performing the side ultrasound scanning modality 254 by the imaging assembly 1300 can be optimized by programming the mixed-signal ICs 1340, 1342, 1344, 1346 to increase or decrease the number of transmit-receive elements within the sub-aperture of the ultrasound transducer array 1320, similar to the description provided above with respect to FIGS. 17-19.

In embodiments where the imaging assembly 1300 includes eight integrated circuits, each integrated circuit can be operatively connected to a dedicated receive channel, and the imaging assembly 1300 is configurable to perform an ultrasound scanning modality that includes transmitting an ultrasound signal on one element of the ultrasound transducer array, and receiving ultrasound signals on eight elements of the ultrasound transducer array. In some embodiments, a SRAM with size 1024×10 bits can support system opcodes for one transmit channel and eight receive channels, and an external host system can include eight receive channels. By increasing the size of SRAM, the external host system can address the additional mixed-signal ICs.

Another example embodiment can include an imaging assembly having a 64-element ultrasound transducer array and eight mixed-signal ICs. Only eight of the 16 transmitters of each mixed-signal IC are connected to transducer elements. An external host system includes eight channels. With the use no-op events an external host system and imaging assembly can be used to reduce the acquisition time.

Another example embodiment can include an imaging assembly having a mixed-signal IC that multiplexes to a number of ultrasound transducer elements different than sixteen. Another example embodiment can include an imaging assembly having a 2D ultrasound transducer array, and the array is a sparse array for providing a forward looking 3D ultrasound scanning modality.

Figure 15:
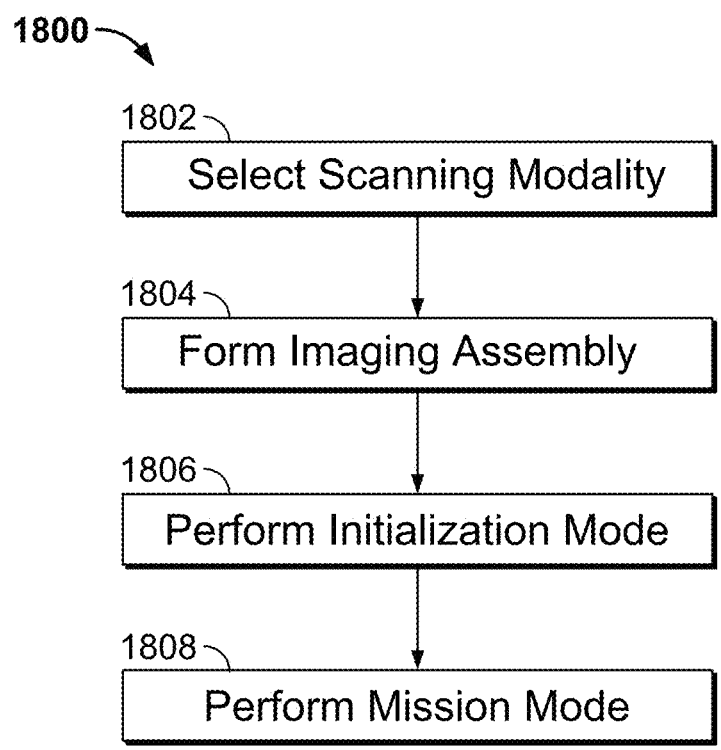
FIG. 15 illustrates a method of performing ultrasound imaging using a programmable imaging assembly.

FIG. 15 illustrates a method 1800 of performing ultrasound imaging using a programmable imaging assembly. The method 1800 includes an operation 1802 of selecting a desired ultrasound scanning modality for an imaging assembly. For example, operation 1802 can include selecting between the cylindrical ultrasound scanning modality 252, the side ultrasound scanning modality 254, and the forward looking 3D ultrasound scanning modality 256 shown in FIG. 3.

Next, the method 1800 includes an operation 1804 of forming and assembling the imaging assembly based on the selected ultrasound scanning modality. In certain embodiments, the imaging assembly is formed by rolling a flexible substrate of the imaging assembly around a sensor assembly section of the catheter or endoscope such that imaging assembly has a tubular structure and a circular cross-sectional shape, such as shown in the embodiment of FIG. 9. In further embodiments, the imaging assembly is formed by folding a flexible substrate of the imaging assembly around a sensor assembly section of the catheter or endoscope such that imaging assembly has a tubular structure and a rectangular cross-sectional shape, such as shown in the embodiment of FIG. 14. In yet further embodiments, the imaging assembly is formed by applying a flexible substrate of the imaging assembly to a surface of a catheter or endoscope without rolling or folding the flexible substrate such that the imaging assembly is substantially flat.

Next, the method 1800 includes an operation 1806 of connecting the imaging assembly to a patient interface module (see FIG. 2), and powering the imaging assembly on to perform an initialization mode that includes uploading a transmit-receive sequence and opcodes to a memory of the imaging assembly. The transmit-receive sequence and opcodes that are uploaded to the memory of the imaging assembly configure the imaging assembly to perform the selected ultrasound scanning modality.

Next, the method 1800 includes an operation 1808 of performing a mission mode which includes using the imaging assembly to perform the selected ultrasound scanning modality. During mission mode, ultrasound signal data from the imaging assembly is acquired and processed by an imaging engine for displaying ultrasound images in accordance with the selected ultrasound scanning modality on a display device such as the display computer or tablet 210 of FIG. 2.

In certain embodiments, an input device such as the display computer or tablet 210 can be used by a user to select/change imaging parameters within the selected ultrasound scanning modality. For example, an integrated circuit clock frequency in the mission mode can be varied to adjust the transmit-receive repetition rate. Also, a differential transmit signal in the mission mode can be varied to change a center frequency of the imaging assembly. Additionally, the differential transmit signal in the mission mode can be varied to adjust an operation of the transmit/receive switch to optimize near-field imaging performance.

Figure 16:
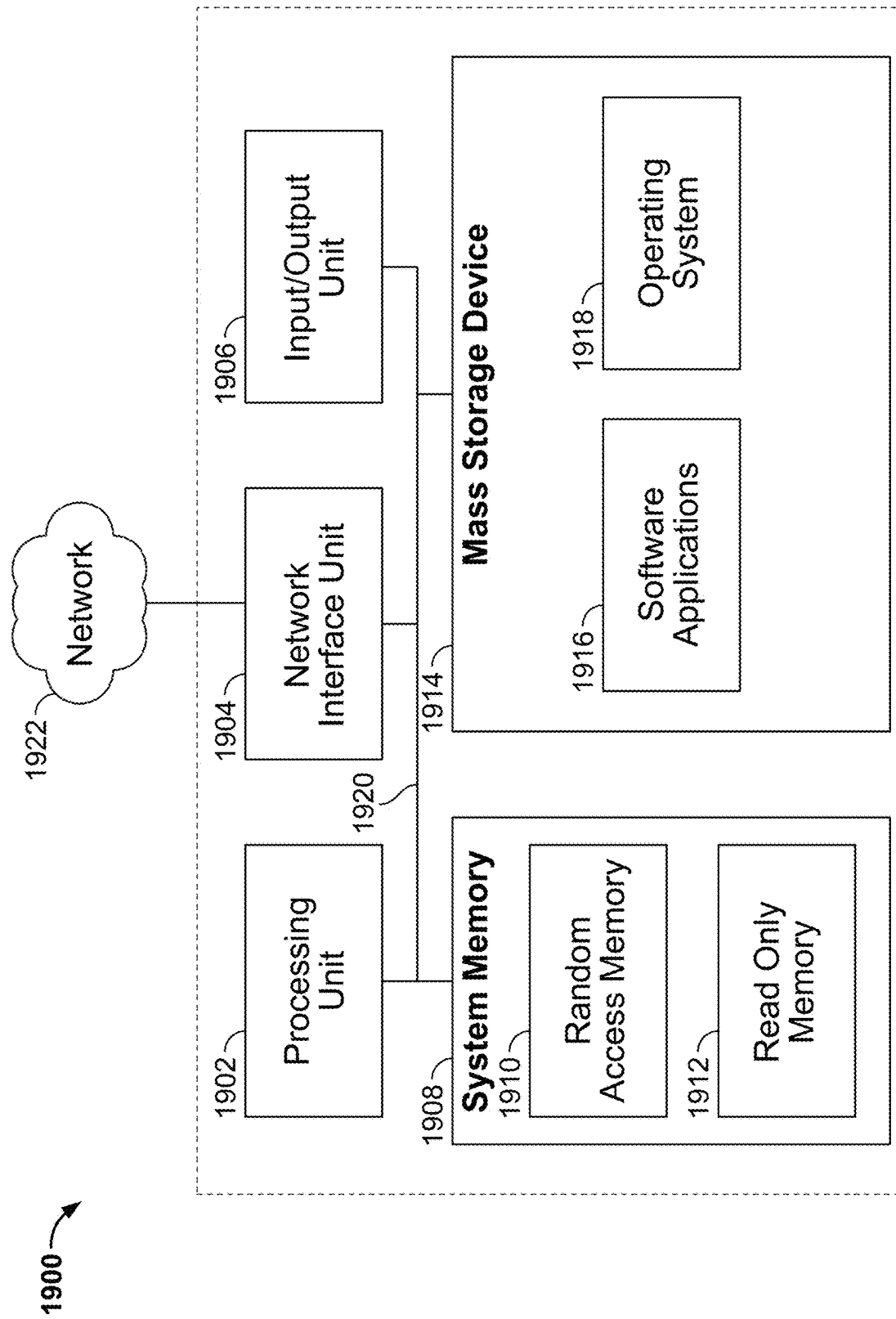
FIG. 16 schematically illustrates an exemplary architecture of a computing device that can be used to implement aspects of the present disclosure.

FIG. 16 illustrates an exemplary architecture of a computing device 1900 which can be used to implement aspects of the present disclosure, such as the functions of the IVUS imaging and pressure sensing console 90, the patient interface module 206, the imaging engine 208, or the display computer or tablet 210 that are described above. The computing device 1900 includes a processing unit 1902, a system memory 1908, and a system bus 1920 that couples the system memory 1908 to the processing unit 1902.

The processing unit 1902 is an example of a processing device such as a central processing unit (CPU). The system memory 1908 includes a random-access memory ("RAM") 1910 and a read-only memory ("ROM") 1912. A basic input/output logic containing the basic routines that help to transfer information between elements within the computing device 1900, such as during startup, is stored in the ROM 1912.

The computing device 1900 can also include a mass storage device 1914 that stores software instructions and data. The mass storage device 1914 is connected to the processing unit 1902 through a mass storage controller connected to the system bus 1920. The mass storage device 1914 and its associated computer-readable data storage media provide non-volatile, non-transitory storage for the computing device 1900.

Although the description of computer-readable data storage media herein refers to a mass storage device, it should be appreciated by those skilled in the art that computer-readable data storage media can be any available non-transitory, physical device or article of manufacture from which the device can read data and/or instructions. The mass storage device 1914 is an example of a computer-readable storage device.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid-state memory technology, or any other medium which can be used to store information, and which can be accessed by the device.

The computing device 1900 may operate in a networked environment using logical connections to remote network devices through the network 1922, such as a local network, the Internet, or another type of network. The device connects to the network 1922 through a network interface unit 1904 connected to the system bus 1920. The network interface unit 1904 may also be utilized to connect to other types of networks and remote computing systems.

The computing device 1900 can also include an input/output controller 1906 for receiving and processing input from a number of input devices. Similarly, the input/output controller 1906 may provide output to a number of output devices.

The mass storage device 1914 and the RAM 1910 can store software instructions and data. The software instructions can include an operating system 1918 suitable for controlling the operation of the device. The mass storage device 1914 and/or the RAM 1910 also store software instructions 1916, that when executed by the processing unit 1902, cause the device to provide the functionality of the device discussed in this document. For example, the mass storage device 1914 and/or the RAM 1910 can store software instructions that, when executed by the processing unit 1902, cause the imaging engine 208 to program and operate the imaging assembly 202 via the patient interface module 206, as shown in FIG. 2.

In accordance with an aspect of the present invention, an intraluminal medical device includes an elongated body including a first section having a first sensor adapted to transmit and receive ultrasound pressure, a second sensor adapted to measure a physiological parameter, and a first integrated circuit that is connected to the first sensor and the second sensor. The first section further includes a lumen adapted to receive a guide wire. The elongated body further includes a second section that is bonded to the first section and has a lumen adapted to house a communication assembly. The first sensor may include an ultrasound transducer array. The first integrated circuit includes transmit and receive electronics to control the first sensor. The second sensor may include a piezoresistive sensor, such as a Wheatstone bridge, for measuring blood pressure. The first section may further include at least one additional integrated circuit that is connected to the first integrated circuit. The at least one additional integrated circuit is further connected to the first sensor. The communication assembly may include a single transmission line to receive the signals from both the first sensor and the second sensor.

In accordance with another aspect of the present invention, an intraluminal medical device includes an elongated body including a first section having a sensor adapted to transmit and receive ultrasound pressure and a first integrated circuit that is connected to the sensor. The elongated body further includes a second section that is bonded to the first section, a first lumen adapted to house a communication assembly, and a second lumen adapted to deliver a needle. The sensor may include an ultrasound transducer array. The first integrated circuit includes transmit and receive electronics to control the first sensor. The first section may further include at least one additional integrated circuit that is connected to the first integrated circuit. The at least one additional integrated circuit is further connected to the sensor. The communication assembly includes a transmission line to receive signals from the first integrated circuit. The communication assembly may further include at least one transmission line to receive signals from the at least one additional integrated circuit.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. An ultrasound imaging device comprising:
    an imaging assembly for minimally invasive insertion inside a patient body, the imaging assembly including:
        an ultrasound transducer array having a plurality of transducer array elements; and
        an integrated circuit operatively connected to the ultrasound transducer array inside the imaging assembly, the integrated circuit including a memory, the integrated circuit including the memory is positioned on a flexible substrate that forms a part of a distal tip, the distal tip having a length between 5 mm and 30 mm, the memory being programmed to store:
            a transmit-receive sequence that includes transmitting an ultrasound signal on one or more than one transducer array element of the plurality of transducer array elements, and receiving ultrasound signals on the one or the more than one transducer array element of the plurality of transducer array elements;
    wherein the integrated circuit is operatively connected on a receive line to the plurality of transducer array elements;
    wherein the memory stores operational codes that optimize a sub-aperture of the ultrasound transducer array by programming the integrated circuit to decrease a number of transmit-receive elements within the sub-aperture to minimize acquisition time and motion artifacts, or to increase the number of transmit-receive elements within the sub-aperture to increase resolution and depth of penetration;
    wherein the memory includes a static random-access memory that dynamically stores the transmit-receive sequence and operational codes to configure the integrated circuit to support an ultrasound scanning modality; and
    wherein the integrated circuit is configured to multiplex output signals from one or more pressure sensors located on the imaging assembly onto a transmission line connected to the integrated circuit and that receives the ultrasound signals from the integrated circuit.

2. The ultrasound imaging device of claim 1, wherein the ultrasound transducer array has 64 transducer array elements, and the ultrasound imaging device comprises first, second, third, and fourth integrated circuits each configured by the memory to transmit on any one transducer array element of the 64 transducer array elements and receive on any one transducer array element of the 64 transducer array elements.

3. The ultrasound imaging device of claim 1, further comprising a first pressure sensor operatively connected to a first integrated circuit that multiplexes a first signal from the first pressure sensor onto the transmission line, and a second pressure sensor operatively connected to a second integrated circuit that multiplexes a second signal from the second pressure sensor onto the transmission line.

4. The ultrasound imaging device of claim 3, wherein the first integrated circuit is driven by a first differential transmitter signal and a clock signal, the second integrated circuit is driven by a second differential transmitter signal and the clock signal, and the first and second differential transmittal signals are different.

5. The ultrasound imaging device of claim 1, wherein the ultrasound transducer array includes eight integrated circuits, each integrated circuit being operatively connected to a dedicated receive line, and the ultrasound imaging device is configured to perform the ultrasound scanning modality that includes transmitting an ultrasound signal on one element of the ultrasound transducer array, and receiving ultrasound signals on eight elements of the ultrasound transducer array.

6. The ultrasound imaging device of claim 5, wherein the ultrasound scanning modality is a cylindrical ultrasound scanning modality, a side ultrasound scanning modality, or a forward looking 3D ultrasound scanning modality.

7. The ultrasound imaging device of claim 1, further comprising a low noise amplifier on the integrated circuit, wherein the low-noise amplifier is configured to provide gain to ultrasonic signals received from the ultrasound transducer array, and the gain provided by the low-noise amplifier is variable to reduce power consumption of the integrated circuit.

8. The ultrasound imaging device of claim 7, wherein the low-noise amplifier is operable to switch off when a receive window is not active to reduce power consumption on the integrated circuit.

9. The ultrasound imaging device of claim 1, further comprising an error checking circuit on the integrated circuit, the error checking circuit using differential signaling to generate a cyclic redundancy check signal enabling the integrated circuit to report errors in the transmit-receive sequences and the operational codes by pulling up or down a DC bias voltage on each of two differential signal wires enabling a 4-bit digital error output.

10. The ultrasound imaging device of claim 1, wherein the integrated circuit is programmed with different transmit-receive sequences to increase or decrease the size of a cylindrical array sub-aperture to optimize imaging parameters.

11. The ultrasound imaging device of claim 1, wherein the integrated circuit is programmed to be driven by different transmit voltages directed to the ultrasound transducer array.

12. The ultrasound imaging device of claim 1, wherein the operational codes optimize the sub-aperture of the ultrasound transducer array to support the ultrasound scanning modality, the sub-aperture having a subset of transducer array elements less than the plurality of transducer array elements.

13. The ultrasound imaging device of claim 1, wherein the transmit-receive sequence includes no-operation events that disable the integrated circuit for a set of clock cycles tracked by a counter within the integrated circuit to reduce heat generated by the imaging assembly.

14. The ultrasound imaging device of claim 1, wherein the integrated circuit is programmable to drive a plurality of ultrasound transducer arrays including a cylindrical array that wraps around a central axis, and a flat array.

* * * * *